US010976938B2

(12) United States Patent
Mukku et al.

(10) Patent No.: US 10,976,938 B2
(45) Date of Patent: Apr. 13, 2021

(54) BLOCK MAP CACHE

(71) Applicant: Robin Systems, Inc., San Jose, CA (US)

(72) Inventors: Jagadish Kumar Mukku, San Jose, CA (US); Dhanashankar Venkatesan, San Jose, CA (US); Ripulkumar Hemantbhai Patel, Fremont, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 309 days.

(21) Appl. No.: 16/049,073

(22) Filed: Jul. 30, 2018

(65) Prior Publication Data

US 2020/0034052 A1    Jan. 30, 2020

(51) Int. Cl.
*G06F 3/06* (2006.01)
*G06F 12/0893* (2016.01)
*G06F 12/10* (2016.01)

(52) U.S. Cl.
CPC ............ *G06F 3/0619* (2013.01); *G06F 3/065* (2013.01); *G06F 3/067* (2013.01); *G06F 3/0656* (2013.01); *G06F 12/0893* (2013.01); *G06F 12/10* (2013.01); *G06F 2212/1032* (2013.01); *G06F 2212/254* (2013.01); *G06F 2212/608* (2013.01)

(58) Field of Classification Search
CPC ...... G06F 3/0619; G06F 3/065; G06F 3/0656; G06F 3/067; G06F 2212/1032; G06F 12/10; G06F 12/0893; G06F 2212/254; G06F 2212/608
USPC ...................................... 711/3, 103
See application file for complete search history.

(56) References Cited

U.S. PATENT DOCUMENTS

| 4,310,883 | A | 1/1982 | Clifton |
| 5,602,993 | A | 2/1997 | Stromberg |
| 6,014,669 | A | 1/2000 | Slaughter |
| 6,052,797 | A | 4/2000 | Ofek |
| 6,119,214 | A | 9/2000 | Dirks |
| 6,157,963 | A | 12/2000 | Courtright, II |
| 6,161,191 | A | 12/2000 | Slaughter |

(Continued)

FOREIGN PATENT DOCUMENTS

WO    WO2017008675    1/2017

OTHER PUBLICATIONS

Segment map.

(Continued)

*Primary Examiner* — Hua J Song
(74) *Attorney, Agent, or Firm* — David R. Stevens; Stevens Law Group

(57) ABSTRACT

A new snapshot of a storage volume is created by suppressing write requests. Once pending write requests from the computing nodes are completed, storage nodes create a new snapshot for the storage volume by allocating a new segment to the new snapshot. Subsequent write requests to the storage volume are then performed on the segments allocated to the new snapshot. A block map records segments where current data for an LBA of a slice of a storage volume is stored. Block maps may be written to a storage device in order to free memory. Block maps may be read back into memory when needed. Writing and reading of block maps may be performed upon fragments of block maps. On restarting of the storage node, block maps may be restored from block maps stored in the storage device.

18 Claims, 14 Drawing Sheets

(56) References Cited

U.S. PATENT DOCUMENTS

| | | |
|---|---|---|
| 6,298,478 B1 | 10/2001 | Nally |
| 6,301,707 B1 | 10/2001 | Carroll |
| 6,311,193 B1 | 10/2001 | Sekido |
| 6,851,034 B2 | 2/2005 | Challenger |
| 6,886,160 B1 | 4/2005 | Lee |
| 6,895,485 B1 | 5/2005 | Dekoning |
| 6,957,221 B1 | 10/2005 | Hart |
| 7,096,465 B1 | 8/2006 | Dardinski |
| 7,111,055 B2 | 9/2006 | Falkner |
| 7,171,659 B2 | 1/2007 | Becker |
| 7,246,351 B2 | 7/2007 | Bloch |
| 7,305,671 B2 | 12/2007 | Davidov |
| 7,461,374 B1 | 12/2008 | Balint |
| 7,590,620 B1 | 9/2009 | Pike |
| 7,698,698 B2 | 4/2010 | Skan |
| 7,721,283 B2 | 5/2010 | Kovachka |
| 7,734,859 B2 | 6/2010 | Daniel |
| 7,738,457 B2 | 6/2010 | Nordmark |
| 7,779,091 B2 | 8/2010 | Wilkinson |
| 7,797,693 B1 | 9/2010 | Gustafson |
| 7,984,485 B1 | 7/2011 | Rao |
| 8,037,471 B2 | 10/2011 | Keller |
| 8,121,874 B1 | 2/2012 | Guheen |
| 8,171,141 B1 | 5/2012 | Offer |
| 8,219,821 B2 | 7/2012 | Zimmels |
| 8,250,033 B1* | 8/2012 | De Souter ........... G06F 16/1734 707/637 |
| 8,261,295 B1 | 9/2012 | Risbood |
| 8,326,883 B2 | 12/2012 | Pizzorni |
| 8,392,498 B2 | 3/2013 | Berg |
| 8,429,346 B1 | 4/2013 | Chen |
| 8,464,241 B2 | 6/2013 | Hayton |
| 8,505,003 B2 | 8/2013 | Bowen |
| 8,527,544 B1 | 9/2013 | Colgrove |
| 8,601,467 B2 | 12/2013 | Hofhansl |
| 8,620,973 B1 | 12/2013 | Veeraswamy |
| 8,666,933 B2 | 3/2014 | Pizzorni |
| 8,745,003 B1 | 6/2014 | Patterson |
| 8,775,751 B1 | 7/2014 | Pendharkar |
| 8,782,632 B1 | 7/2014 | Chigurapati |
| 8,788,634 B2 | 7/2014 | Krig |
| 8,832,324 B1 | 9/2014 | Hodges |
| 8,886,806 B2 | 11/2014 | Tung |
| 8,909,885 B2 | 12/2014 | Corbett |
| 8,954,383 B1 | 2/2015 | Vempati |
| 8,954,568 B2 | 2/2015 | Krishnan |
| 8,966,198 B1 | 2/2015 | Harris |
| 9,134,992 B2 | 9/2015 | Wong |
| 9,146,769 B1 | 9/2015 | Shankar |
| 9,148,465 B2 | 9/2015 | Gambardella |
| 9,152,337 B2 | 10/2015 | Kono |
| 9,167,028 B1 | 10/2015 | Bansal |
| 9,280,591 B1 | 3/2016 | Kharatishvili |
| 9,330,155 B1 | 5/2016 | Bono |
| 9,336,060 B2 | 5/2016 | Nori |
| 9,342,444 B2 | 5/2016 | Minckler |
| 9,367,301 B1 | 6/2016 | Serrano |
| 9,390,128 B1 | 7/2016 | Seetala |
| 9,436,693 B1 | 9/2016 | Lockhart |
| 9,514,160 B2 | 12/2016 | Song |
| 9,521,198 B1 | 12/2016 | Agarwala |
| 9,569,274 B2 | 2/2017 | Tarta |
| 9,600,193 B2 | 3/2017 | Ahrens |
| 9,613,119 B1 | 4/2017 | Aron |
| 9,619,389 B1 | 4/2017 | Roug |
| 9,635,132 B1 | 4/2017 | Lin |
| 9,667,470 B2 | 5/2017 | Prathipati |
| 9,747,096 B2 | 8/2017 | Searle |
| 9,870,366 B1 | 1/2018 | Duan |
| 9,880,933 B1 | 1/2018 | Gupta |
| 9,892,265 B1 | 2/2018 | Tripathy |
| 9,998,955 B1 | 6/2018 | MacCarthaigh |
| 10,019,459 B1 | 7/2018 | Agarwala |
| 10,042,628 B2 | 8/2018 | Thompson |
| 10,061,520 B1 | 8/2018 | Zhao |
| 10,191,778 B1 | 1/2019 | Yang |
| 10,241,774 B2 | 3/2019 | Spivak |
| 10,282,229 B2 | 5/2019 | Wagner |
| 10,353,634 B1 | 7/2019 | Greenwood |
| 10,430,434 B2 | 10/2019 | Sun |
| 2004/0153703 A1 | 8/2004 | Vigue |
| 2004/0221125 A1 | 11/2004 | Ananthanarayanan |
| 2005/0065986 A1 | 3/2005 | Bixby |
| 2005/0216895 A1 | 9/2005 | Tran |
| 2006/0053357 A1 | 3/2006 | Rajski |
| 2006/0085674 A1 | 4/2006 | Ananthamurthy |
| 2006/0259686 A1 | 11/2006 | Sonobe |
| 2007/0006015 A1 | 1/2007 | Rao |
| 2007/0067583 A1 | 3/2007 | Zohar |
| 2007/0260842 A1 | 11/2007 | Faibish |
| 2007/0277056 A1 | 11/2007 | Varadarajan |
| 2007/0288791 A1 | 12/2007 | Allen |
| 2008/0010421 A1 | 1/2008 | Chen |
| 2008/0068899 A1 | 3/2008 | Ogihara |
| 2008/0189468 A1 | 8/2008 | Schmidt |
| 2008/0270592 A1 | 10/2008 | Choudhary |
| 2009/0144497 A1 | 6/2009 | Withers |
| 2009/0172335 A1 | 7/2009 | Kulkarni |
| 2009/0240809 A1 | 9/2009 | La Frese |
| 2009/0254701 A1 | 10/2009 | Kurokawa |
| 2009/0307249 A1 | 12/2009 | Koifman |
| 2010/0161941 A1 | 6/2010 | Vyshetsky |
| 2010/0162233 A1 | 6/2010 | Ku |
| 2010/0211815 A1 | 8/2010 | Mankovskii |
| 2010/0274984 A1 | 10/2010 | Inomata |
| 2010/0299309 A1 | 11/2010 | Maki |
| 2010/0306495 A1 | 12/2010 | Kumano |
| 2010/0332730 A1 | 12/2010 | Royer |
| 2011/0083126 A1 | 4/2011 | Bhakta |
| 2011/0188506 A1 | 8/2011 | Arribas |
| 2011/0208928 A1 | 8/2011 | Chandra |
| 2011/0246420 A1 | 10/2011 | Wang |
| 2011/0276951 A1 | 11/2011 | Jain |
| 2012/0005557 A1 | 1/2012 | Mardiks |
| 2012/0066449 A1 | 3/2012 | Colgrove |
| 2012/0102369 A1 | 4/2012 | Hiltunen |
| 2012/0216052 A1 | 8/2012 | Dunn |
| 2012/0226667 A1 | 9/2012 | Volvovski |
| 2012/0240012 A1 | 9/2012 | Weathers |
| 2012/0259819 A1 | 10/2012 | Patwardhan |
| 2012/0265976 A1 | 10/2012 | Spiers |
| 2012/0311671 A1 | 12/2012 | Wood |
| 2012/0331113 A1 | 12/2012 | Jain |
| 2013/0054552 A1 | 2/2013 | Hawkins |
| 2013/0054932 A1 | 2/2013 | Acharya |
| 2013/0080723 A1 | 3/2013 | Sawa |
| 2013/0282662 A1 | 10/2013 | Kumarasamy |
| 2013/0339659 A1 | 12/2013 | Bybell |
| 2013/0346709 A1 | 12/2013 | Wang |
| 2014/0006465 A1 | 1/2014 | Davis |
| 2014/0047263 A1 | 2/2014 | Coatney |
| 2014/0047341 A1 | 2/2014 | Breternitz |
| 2014/0047342 A1 | 2/2014 | Breternitz |
| 2014/0058871 A1 | 2/2014 | Marr |
| 2014/0059527 A1 | 2/2014 | Gagliardi |
| 2014/0059528 A1 | 2/2014 | Gagliardi |
| 2014/0108483 A1 | 4/2014 | Tarta |
| 2014/0130040 A1 | 5/2014 | Lemanski |
| 2014/0195847 A1 | 7/2014 | Webman |
| 2014/0245319 A1 | 8/2014 | Fellows |
| 2014/0282596 A1 | 9/2014 | Bourbonnais |
| 2015/0046644 A1 | 2/2015 | Karp |
| 2015/0067031 A1 | 3/2015 | Acharya |
| 2015/0074358 A1 | 3/2015 | Flinsbaugh |
| 2015/0112951 A1 | 4/2015 | Narayanamurthy |
| 2015/0134857 A1 | 5/2015 | Hahn et al. |
| 2015/0149605 A1 | 5/2015 | de la Iglesia |
| 2015/0186217 A1 | 7/2015 | Eslami |
| 2015/0278333 A1 | 10/2015 | Hirose |
| 2015/0317212 A1 | 11/2015 | Lee |
| 2015/0326481 A1 | 11/2015 | Rector |
| 2015/0379287 A1 | 12/2015 | Mathur |
| 2016/0011816 A1 | 1/2016 | Aizman |
| 2016/0042005 A1 | 2/2016 | Liu |

(56) References Cited

U.S. PATENT DOCUMENTS

| | | |
|---|---|---|
| 2016/0124775 A1 | 5/2016 | Ashtiani |
| 2016/0197995 A1 | 7/2016 | Lu |
| 2016/0239412 A1 | 8/2016 | Wada |
| 2016/0259597 A1 | 9/2016 | Worley |
| 2016/0283261 A1 | 9/2016 | Nakatsu |
| 2016/0357456 A1 | 12/2016 | Iwasaki |
| 2016/0357548 A1 | 12/2016 | Stanton |
| 2016/0373327 A1 | 12/2016 | Degioanni |
| 2017/0060710 A1 | 3/2017 | Ramani |
| 2017/0060975 A1 | 3/2017 | Akyureklier |
| 2017/0139645 A1* | 5/2017 | Byun .............. G06F 3/0659 |
| 2017/0149843 A1 | 5/2017 | Amulothu |
| 2017/0168903 A1 | 6/2017 | Dornemann |
| 2017/0192889 A1 | 7/2017 | Sato et al. |
| 2017/0214550 A1 | 7/2017 | Kumar |
| 2017/0235649 A1 | 8/2017 | Shah |
| 2017/0242617 A1 | 8/2017 | Walsh |
| 2017/0242719 A1 | 8/2017 | Tsirkin |
| 2017/0244557 A1 | 8/2017 | Riel |
| 2017/0244787 A1 | 8/2017 | Rangasamy |
| 2017/0322954 A1 | 11/2017 | Horowitz |
| 2017/0337492 A1 | 11/2017 | Chen |
| 2017/0371551 A1 | 12/2017 | Sachdev |
| 2018/0006896 A1 | 1/2018 | Macnamara |
| 2018/0024889 A1 | 1/2018 | Verma |
| 2018/0046553 A1 | 2/2018 | Okamoto |
| 2018/0082053 A1 | 3/2018 | Brown |
| 2018/0107419 A1 | 4/2018 | Sachdev |
| 2018/0113625 A1 | 4/2018 | Sancheti |
| 2018/0113770 A1 | 4/2018 | Hasanov |
| 2018/0136931 A1 | 5/2018 | Hendrich |
| 2018/0137306 A1 | 5/2018 | Brady |
| 2018/0159745 A1 | 6/2018 | Byers |
| 2018/0165170 A1 | 6/2018 | Hegdal |
| 2018/0218000 A1 | 8/2018 | Setty |
| 2018/0225216 A1 | 8/2018 | Filippo |
| 2018/0246745 A1 | 8/2018 | Aronovich |
| 2018/0247064 A1 | 8/2018 | Aronovich |
| 2018/0276215 A1 | 9/2018 | Chiba |
| 2018/0285164 A1 | 10/2018 | Hu |
| 2018/0285223 A1 | 10/2018 | McBride |
| 2018/0285353 A1 | 10/2018 | Ramohalli |
| 2018/0287883 A1 | 10/2018 | Joshi |
| 2018/0302335 A1 | 10/2018 | Gao |
| 2018/0329981 A1 | 11/2018 | Gupte |
| 2018/0336104 A1* | 11/2018 | Koo .............. G06F 11/1458 |
| 2018/0364917 A1 | 12/2018 | Ki |
| 2018/0375728 A1 | 12/2018 | Gangil |
| 2019/0065061 A1 | 2/2019 | Kim |
| 2019/0065323 A1 | 2/2019 | Dhamdhere |
| 2019/0073132 A1 | 3/2019 | Zhou |
| 2019/0073372 A1 | 3/2019 | Venkatesan |
| 2019/0079928 A1 | 3/2019 | Kumar |
| 2019/0089651 A1 | 3/2019 | Pignatari |
| 2019/0109756 A1 | 4/2019 | Abu Lebdeh |
| 2019/0156023 A1 | 5/2019 | Gerebe |
| 2019/0163460 A1 | 5/2019 | Kludy |
| 2019/0188094 A1 | 6/2019 | Ramamoorthi |
| 2019/0190803 A1 | 6/2019 | Joshi |
| 2019/0199601 A1 | 6/2019 | Lynar |
| 2019/0213085 A1 | 7/2019 | Alluboyina |
| 2019/0215313 A1 | 7/2019 | Doshi |
| 2019/0220266 A1 | 7/2019 | Doshi |
| 2019/0220315 A1 | 7/2019 | Vallala |
| 2019/0235895 A1 | 8/2019 | Ovesea |
| 2019/0250849 A1 | 8/2019 | Compton |
| 2019/0272205 A1 | 9/2019 | Jiang |
| 2019/0278624 A1 | 9/2019 | Bade |
| 2019/0324666 A1 | 10/2019 | Kusters |
| 2020/0019414 A1 | 1/2020 | Byard |
| 2020/0034193 A1 | 1/2020 | Jayaram |
| 2020/0083909 A1 | 3/2020 | Kusters |

OTHER PUBLICATIONS

Fast and Secure Append-Only storage with Infinite Capacity, Zheng.

User Mode and Kernel Mode, Microsoft.

Implementing time critical functionalities with a distributed adaptive container architecture, Stankovski.

Precise memory leak detection for java software using container profiling, XU.

Segment map, Google, Feb. 4, 2019.

Fast and Secure Append-Only storage with Infinite Capacity, Zheng, Aug. 27, 2003.

User Mode and Kernel Mode, Microsoft, Apr. 19, 2017.

Precise memory leak detection for java software using container profiling, Xu, Jul. 2013.

Mogi et al., "Dynamic Parity Stripe Reorganizations for RAID5 Disk Arrays," 1994, IEEE, pp. 17-26.

Syed et al, "The Container Manager Pattern", ACM, pp. 1-9 (Year 2017).

Rehmann et al., "Performance of Containerized Database Management Systems", ACM, pp. 1-6 (Year 2018).

Awada et al, "Improving Resource Efficiency of Container-instance Clusters on Clouds", IEEE, pp. 929-934 (Year 2017).

Stankovski et al, "Implementing Time-Critical Functionalities with a Distributed Adaptive Container Architecture", ACM, pp. 1-5 (Year 2016).

Dhakate et al, "Distributed Cloud Monitoring Using Docker as Next Generation Container Virtualization Technology" IEEE, pp. 1-5 (Year 2015).

Crameri et al, "Staged Deployment in Mirage, an Integrated Software Upgrade Testing and Distribution System", ACM, pp. 221-236 (Year: 2007).

Cosmo et al, "Packages Upgrades in FOSS Distributions: Details and Challenges", AC 2008).

Burg et al, "Atomic Upgrading of Distributed Systems", ACM, pp. 1-5 (Year: 2008).

Souer et al, "Component Based Architecture forWeb Content Management: Runtime Deployable Web Manager Component Bundles", IEEE, pp. 366-369 (Year: 2008).

Weingartner et al, "A distributed autonomic management framework for cloud computing orchestration." In 2016 IEEE World Congress on Services (Year: 2016).

* cited by examiner

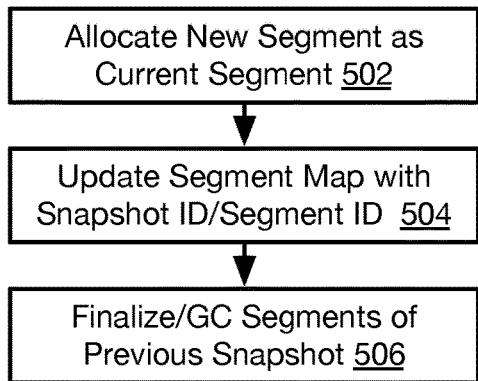
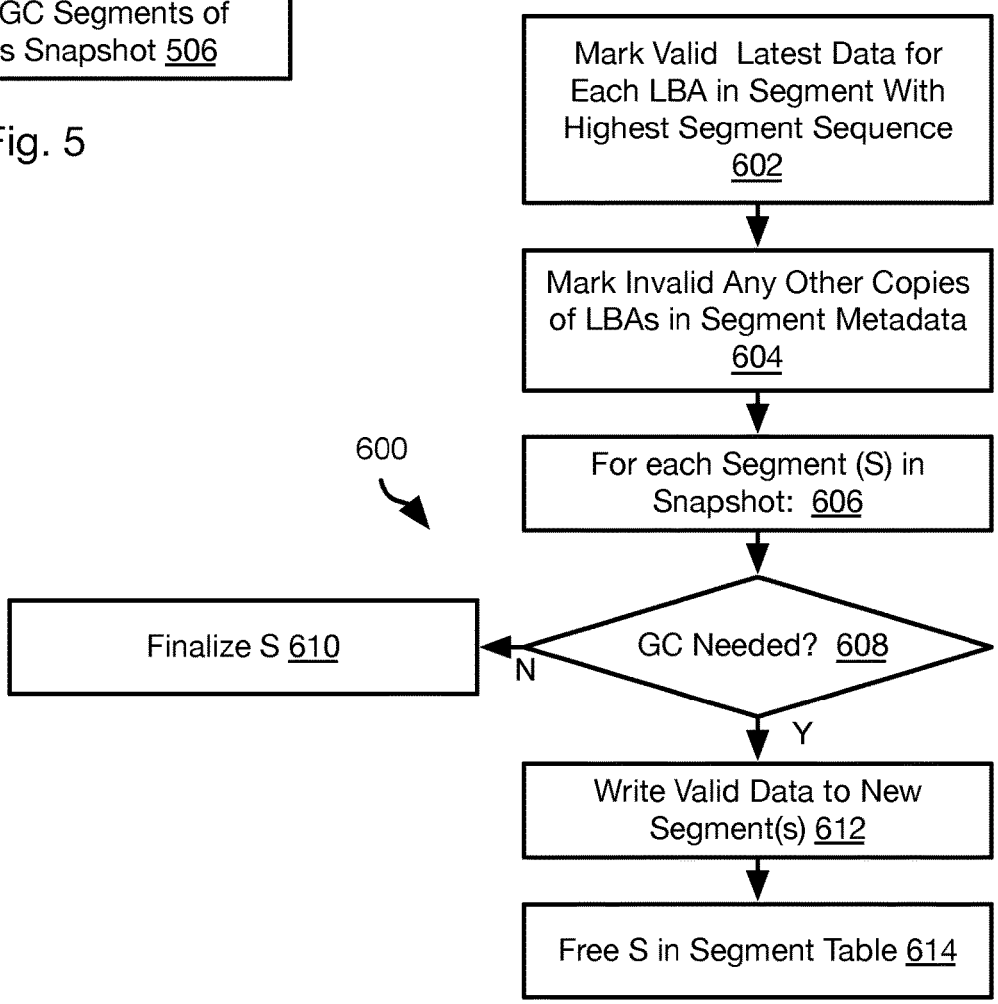
Fig. 5
Fig. 6

BLOCK MAP CACHE

BACKGROUND

Field of the Invention

This invention relates to orchestration of roles in an application instantiated in a distributed storage and computation system.

Background of the Invention

In many contexts, it is helpful to be able to return a database to an original state or some intermediate state. In this manner, changes to software or other database configuration parameters may be tested without fear of corrupting critical data.

The systems and methods disclosed herein provide an improved approach for creating snapshots of a database and returning to a previous snapshot.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 5 is a process flow diagram of a method for processing a snapshot instruction by a storage node in accordance with an embodiment of the present invention;

FIG. 6 is a process flow diagram of a method for performing garbage collection on segments in accordance with an embodiment of the present invention;

DETAILED DESCRIPTION

Figure 1:
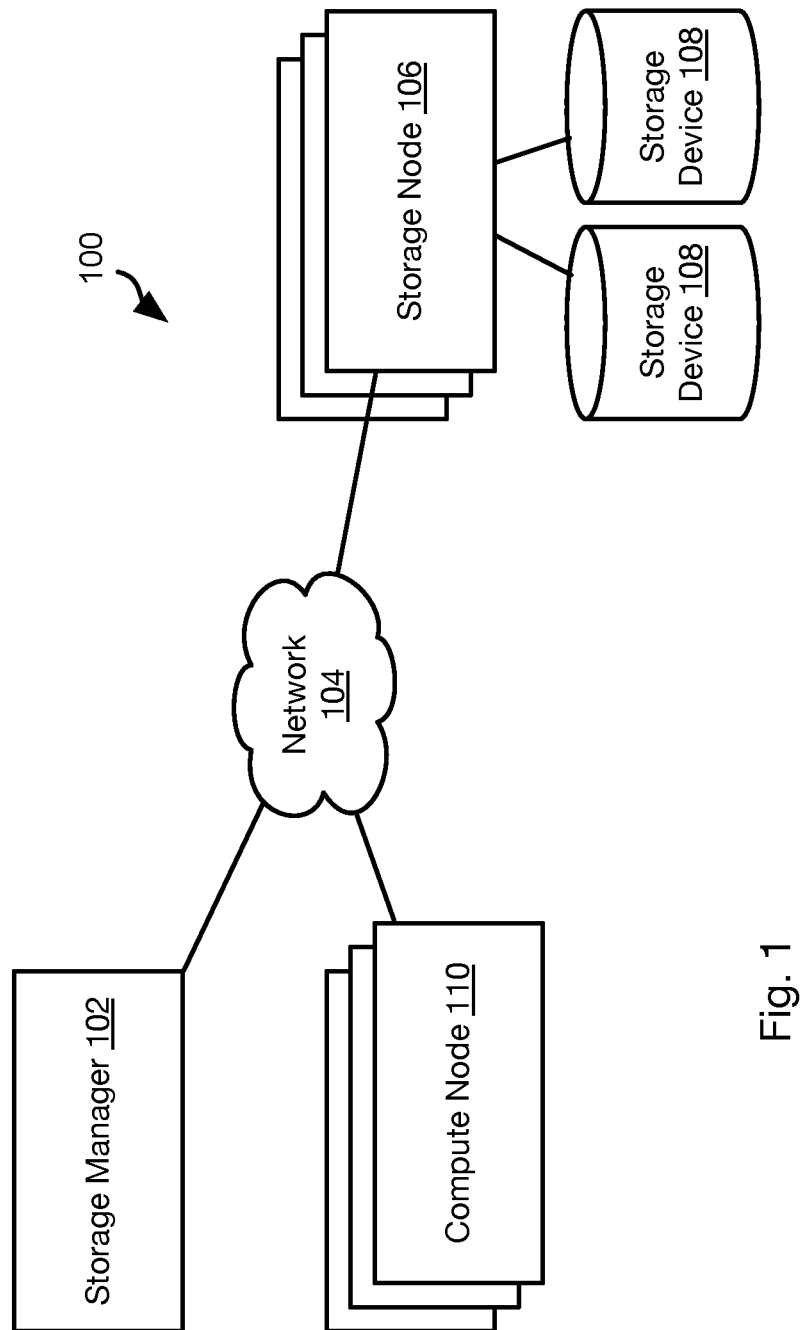
FIG. 1 is a schematic block diagram of a network environment for implementing methods in accordance with an embodiment of the present invention.

Referring to FIG. 1, the methods disclosed herein may be performed using the illustrated network environment 100. The network environment 100 includes a storage manager 102 that coordinates the creation of snapshots of storage volumes and maintains records of where snapshots are stored within the network environment 100. In particular, the storage manager 102 may be connected by way of a network 104 to one or more storage nodes 106, each storage node having one or more storage devices 108, e.g. hard disk drives, flash memory, or other persistent or transitory memory. The network 104 may be a local area network (LAN), wide area network (WAN), or any other type of network including wired, fireless, fiber optic, or any other type of network connections.

One or more compute nodes 110 are also coupled to the network 104 and host user applications that generate read and write requests with respect to storage volumes managed by the storage manager 102 and stored within the memory devices 108 of the storage nodes 108.

The methods disclosed herein ascribe certain functions to the storage manager 102, storage nodes 106, and compute node 110. The methods disclosed herein are particularly useful for large scale deployment including large amounts of data distributed over many storage nodes 106 and accessed by many compute nodes 110. However, the methods disclosed herein may also be implemented using a single computer implementing the functions ascribed herein to some or all of the storage manager 102, storage nodes 106, and compute node 110.

Figure 2:
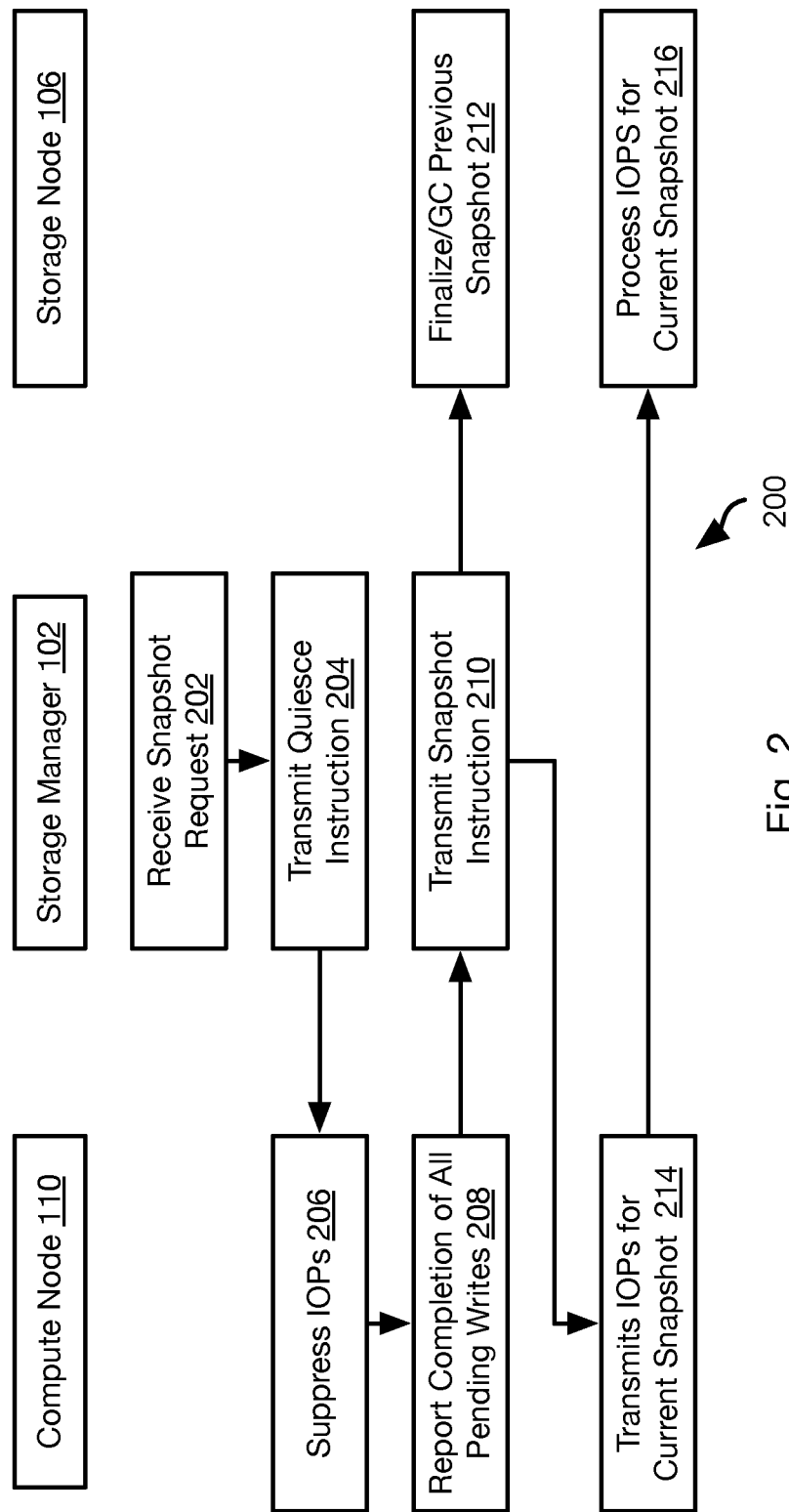
FIG. 2 is a process flow diagram of a method for coordinating snapshot creation with compute nodes and storage nodes in accordance with an embodiment of the present invention.

Referring to FIG. 2, the illustrated method 200 may be performed in order to invoke the creation of a new snapshot. Other than a current snapshot, which is still subject to change, a snapshot captures the state of a storage volume at a moment in time and is preferably not altered in response to subsequent writes to the storage volume.

The method 200 includes receiving, by the storage manager 102 a request to create a new snapshot for a storage volume. A storage volume as referred to herein may be a virtual storage volume that may divided into individual slices. For example, storage volumes as described herein may be 1 TB and be divided into 1 GB slices. In general, a slice and its snapshot are stored on a single storage node 106, whereas a storage volume may have the slices thereof stored by multiple storage nodes 106.

The request received at step 202 may be received from a human operator or generated automatically, such as according to backup scheduler executing on the storage manager 102 or some other computing device. The subsequent steps of the method 200 may be executed in response to receiving 202 the request The method 200 may include transmitting 204 a quiesce instruction to all compute nodes 110 that are associated with the storage volume. For example, all compute nodes 110 that have pending write requests to the storage volume. In some embodiments, the storage manager 102 may store a mapping of compute nodes 110 to a particular storage volume used by the compute nodes 110. Accordingly, step 204 may include sending 204 the quiesce instruction to all of these compute nodes. Alternatively, the instruction may be transmitted 204 to all compute nodes 110 and include an identifier of the storage volume. The compute nodes 110 may then suppress any write instructions referencing that storage volume.

The quiesce instruction instructs the compute nodes 110 that receive it to suppress 206 transmitting write requests to the storage nodes 106 for the storage volume referenced by the quiesce instruction. The quiesce instruction may further cause the compute nodes 110 that receive it to report 208 to the storage manager 102 when no write requests are pending for that storage volume, i.e. all write requests issued to one or more storage nodes 106 and referencing slices of that storage volume have been acknowledged by the one or more storage nodes 106.

In response to receiving the report of step 208 from one or more compute nodes, e.g. all compute nodes that are mapped to the storage node that is the subject of the snapshot request of step 202, the storage manager 102 transmits 210 an instruction to the storage nodes 106 associated with the storage volume to create a new snapshot of that storage volume. Step 210 may further include transmitting 210 an instruction to the compute nodes 110 associated with the storage volume to commence issuing write commands to the storage nodes 106 associated with the storage volume. In some embodiments, the instruction of step 110 may include an identifier of the new snapshot. Accordingly, subsequent input/output operations (IOPs) transmitted 214 from the compute nodes may reference that snapshot identifier. Likewise, the storage node 106 may associate the snapshot identifier with data subsequently written to the storage volume, as described in greater detail below.

In response to receiving 210 the instruction to create a new snapshot, each storage node 106 finalizes 212 segments associated with the current snapshot, which may include performing garbage collection, as described in greater detail below. In addition, subsequent IOPs received by the storage node may also be processed 216 using the new snapshot as the current snapshot, as is also described in greater detail below.

Figure 3:
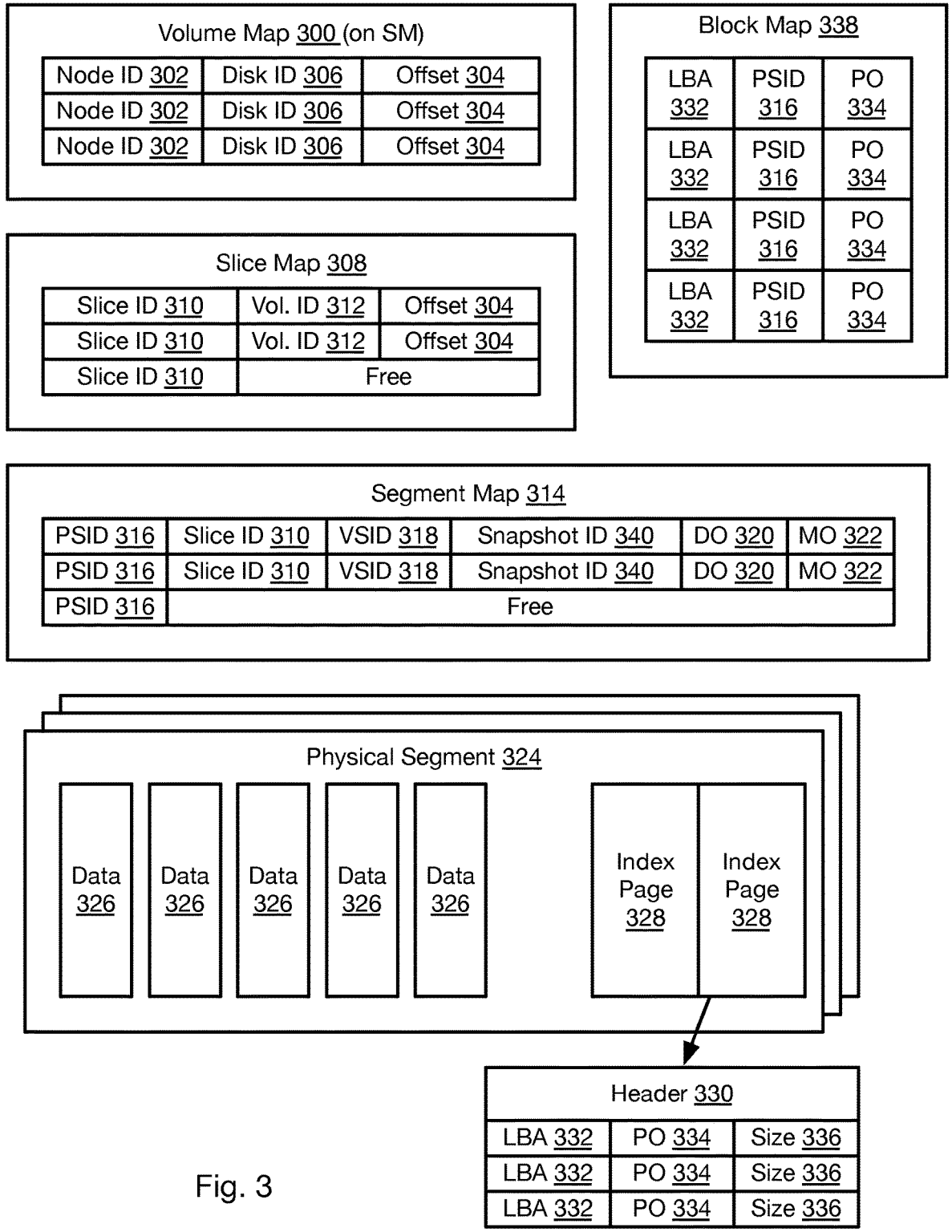
FIG. 3 is a schematic diagram illustrating the storage of data within a storage node in accordance with an embodiment of the present invention.

Referring to FIG. 3, the method by which slices are allocated, reassigned, written to, and read from may be understood with respect to the illustrated data storage scheme. The data of the storage scheme may be stored in transitory or persistent memory of the storage node 106, such as in the storage devices 108.

For each logical volume, the storage manager 102 may store and maintain a volume map 300. For each slice in the logical volume, the volume map may include an entry including a node identifier 302 identifying the storage node 106 to which the slice is assigned and an offset 304 within the logical volume at which the slice begins. In some embodiments, slices are assigned both to a storage node 106 and a specific storage device hosted by the storage node 106. Accordingly, the entry may further include a disk identifier of the storage node 106 referencing the specific storage device to which the slice is assigned.

The remaining data structures of FIG. 3 are stored on each storage node 106. The storage node 106 may store a slice map 308. The slice map 308 may include entries including a local slice identifier 310 that uniquely identifies each slice of the storage node 106, e.g. each slice of each storage device hosted by the storage node 106. The entry may further include a volume identifier 312 that identifies the logical volume to which the local slice identifier 310 is assigned. The entry may further include the offset 304 within the logical volume of the slice of the logical volume assigned to the storage node 106.

In some embodiments, an entry in the slice map 308 is created for a slice of the logical volume only after a write request is received that references the offset 304 for that slice. This further supports the implementation of overprovisioning such that slices may be assigned to a storage node 106 in excess of its actual capacity since the slice is only tied up in the slice map 308 when it is actually used.

The storage node 106 may further store and maintain a segment map 314. The segment map 314 includes entries either including or corresponding to a particular physical segment identifier (PSID) 316. For example, the segment map 314 may be in an area of memory such that each address in that area corresponds to one PSID 316 such that the entry does not actually need to include the PSID 316. The entries of the segment map 314 may further include a slice identifier 310 that identifies a local slice of the storage node 106 to which the PSID 316 has been assigned. The entry may further include a virtual segment identifier (VSID) 318. As described in greater detail below, each time a segment is assigned to logical volume and a slice of a logical volume, it may be assigned a VSID 318 such that the VSIDs 318 increase in value monotonically in order of assignment. In this manner, the most recent PSID 316 assigned to a logical volume and slice of a logical volume may easily be determined by the magnitude of the VSIDs 318 mapped to the PSIDs 316. In some embodiments, VSIDs 318 are assigned in a monotonically increasing series for all segments assigned to volume ID 312. In other embodiments, each offset 304 and its corresponding slice ID 310 is assigned VSIDs separately, such that each slice ID 310 has its own corresponding series of monotonically increasing VSIDs 318 assigned to segments allocated to that slice ID 310.

The entries of the segment map 314 may further include a data offset 320 for the PSID 316 of that entry. As described in greater detail below, when data is written to a segment it may be written at a first open position from a first end of the segment. Accordingly, the data offset 320 may indicate the location of this first open position in the segment. The data offset 320 for a segment may therefore be updated each time data is written to the segment to indicate where the new first open position is.

The entries of the segment map 314 may further include a metadata offset 322. As described in detail below, for each write request written to a segment, a metadata entry may be stored in that segment at a first open position from a second end of the segment opposite the first end. Accordingly, the metadata offset 322 in an entry of the segment map 314 may indicate a location of this first open position of the segment corresponding to the entry.

Each PSID 316 corresponds to a physical segment 324 on a device hosted by the storage node 106. As shown, data payloads 326 from various write requests are written to the physical segment 324 starting from a first end (left) of the physical segment. The physical segment may further store index pages 328 such that index pages are written starting from a second end (right) of the physical segment 324.

Each index page 328 may include a header 330. The header 330 may be coded data that enables identification of a start of an index page 328. The entries of the index page 328 each correspond to one of the data payloads 326 and are written in the same order as the data payloads 326. Each entry may include a logical block address (LBA) 332. The LBA 332 indicates an offset within the logical volume to which the data payload corresponds. The LBA 332 may indicate an offset within a slice of the logical volume. For example, inasmuch as the PSID 316 is mapped to a slice ID 310 that is mapped to an offset 304 within a particular volume ID 312, maps 308 and 314, and an LBA 332 within the slice may be mapped to the corresponding offset 304 to obtain a fully resolved address within the logical volume.

In some embodiments, the entries of the index page 328 may further include a physical offset 334 of the data payload 326 corresponding to that entry. Alternatively or additionally, the entries of the index page 328 may include a size 336 of the data payload 326 corresponding to the entry. In this manner, the offset to the start of a data payload 326 for an entry may be obtained by adding up the sizes 336 of previously written entries in the index pages 328.

The metadata offset 322 may point to the last index page 328 (furthest from right in illustrated example) and may further point to the first open entry in the last index page 328. In this manner, for each write request, the metadata entry for that request may be written to the first open position in the last index page 328. If all of the index pages 328 are full, a new index page 328 may be created and stored at the first open position from the second end and the metadata for the write request may be added at the first open position in that index page 328.

The storage node 106 may further store and maintain a block map 338. A block map 338 may be maintained for each logical volume and/or for each slice offset of each logical volume, e.g. for each local slice ID 310 which is mapped to a slice offset and logical volume by slice map 308. The entries of the block map 338 map include entries corresponding to each LBA 332 within the logical volume or slice of the logical volume. The entries may include the LBA 332 itself or may be stored at a location within the block map corresponding to an LBA 332.

The entry for each LBA 332 may include the PSID 316 identifying the physical segment 324 to which a write request referencing that LBA was last written. In some embodiments, the entry for each LBA 332 may further indicate the physical offset 334 within that physical segment 324 to which the data for that LBA was written. Alternatively, the physical offset 324 may be obtained from the index pages 328 of that physical segment. As data is written to an LBA 332, the entry for that LBA 332 may be overwritten to indicate the physical segment 324 and physical offset 334 within that segment 324 to which the most recent data was written.

In embodiments implementing multiple snapshots for a volume and slice of a volume, the segment map 314 may additionally include a snapshot ID 340 identifying the snapshot to which the PSID 316 has been assigned. In particular, each time a segment is allocated to a volume and slice of a volume, the current snapshot identifier for that volume and slice of a volume will be included as the snapshot ID 340 for that PSID 316.

In response to an instruction to create a new snapshot for a volume and slice of a volume, the storage node 106 will store the new current snapshot identifier, e.g. increment the previously stored current snapshot ID 340, and subsequently allocated segments will include the current snapshot ID 340. PSIDs 316 that are not filled and are allocated to the previous snapshot ID 340 may no longer be written to. Instead, they may be finalized or subject to garbage collection (see FIGS. 5 and 6).

Figure 4:
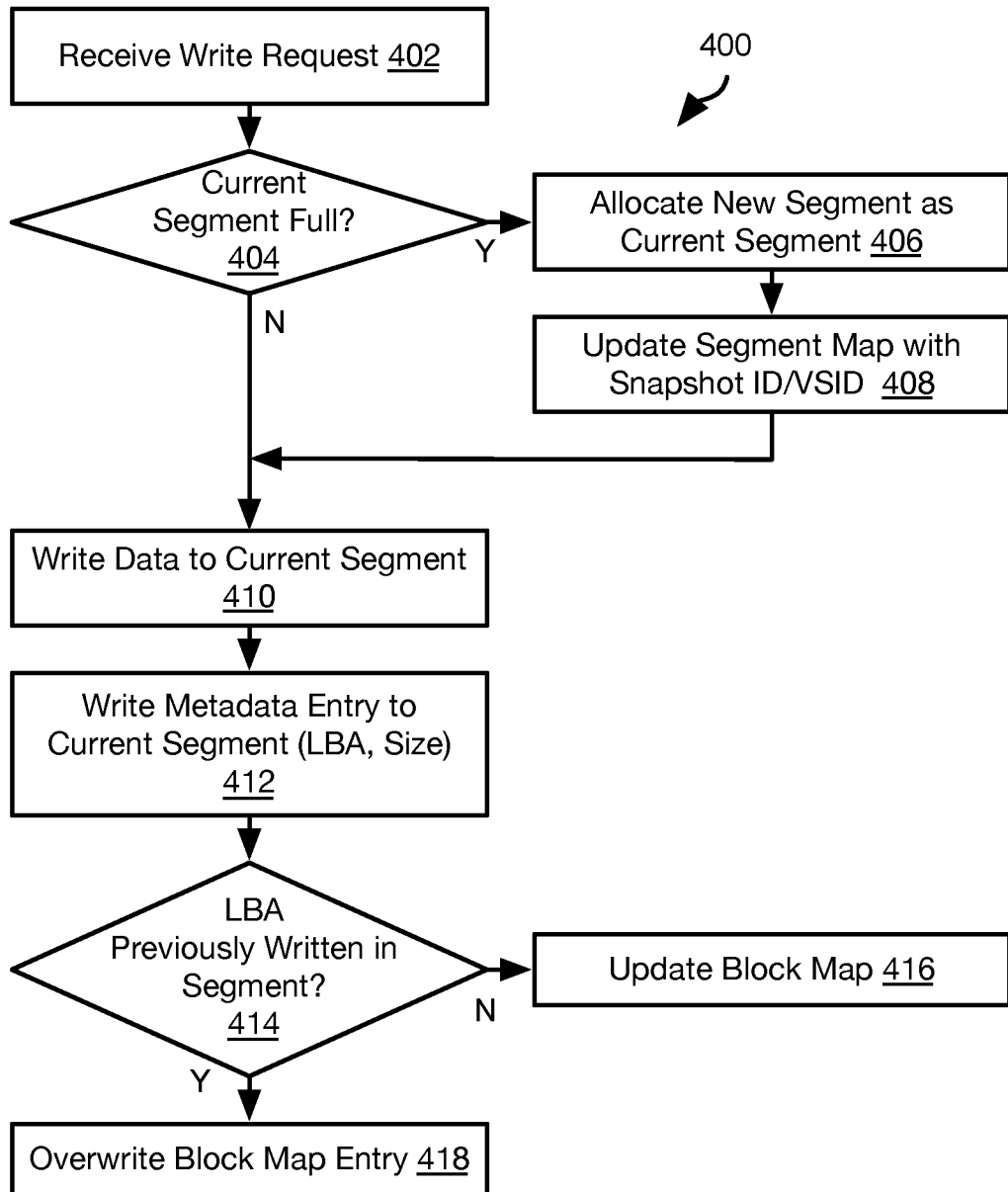
FIG. 4 is a process flow diagram of a method for processing write requests in a storage node in accordance with an embodiment of the present invention.

FIG. 4 illustrates a method 400 for executing write instructions by a storage node 106, such as write instructions received from an application executing on a compute node 110.

The method 400 includes receiving 402 a write request. The write request may include payload data, payload data size, and an LBA as well as fields such as a slice identifier, a volume identifier, and a snapshot identifier. Where a slice identifier is included, the LBA may be an offset within the slice, otherwise the LBA may be an address within the storage volume.

The method 400 may include evaluating 404 whether a PSID 316 is allocated to the snapshot referenced in the write request and whether the physical segment 324 corresponding to the PSID 316 ("the current segment") has space for the payload data. In some embodiments, as write requests are performed with respect to a PSID 316, the amount of data written as data 326 and index pages 328 may be tracked, such as by way of the data offset 320 and metadata offset 322 pointers. Accordingly, if the amount of previously-written data 326 and the number of allocated index pages 328 plus the size of the payload data and its corresponding metadata entry exceeds the capacity of the current segment it may be determined to be full at step 404.

If the current segment is determined 404 to be full, the method 400 may include allocating 406 a new PSID 316 as the current PSID 316 and its corresponding physical segment 324 as the current segment for the snapshot referenced in the write request. In some embodiments, the status of PSIDs 316 of the physical storage devices 108 may be flagged in the segment map 314 as allocated or free as a result of allocation and garbage collection, which is discussed below. Accordingly, a free PSID 316 may be identified in the segment map 314 and flagged as allocated.

The segment map 314 may also be updated 408 to include a slice ID 310 and snapshot ID 340 mapping the current PSID 316 to the snapshot ID, volume ID 312, and offset 304 included in the write request. Upon allocation, the current PSID 316 may also be mapped to a VSID (virtual segment identifier) 318 that will be a number higher than previously VSIDs 318 such that the VSIDs increase monotonically, subject, of course, to the size limit of the field used to store the VSID 318. However, the size of the field may be sufficiently large that it is not limiting in most situations.

The method 400 may include writing 410 the payload data to the current segment. As described above, this may include writing 410 payload data 326 to the free location closest to the first end of the current segment.

The method 400 may further include writing 412 a metadata entry to the current segment. This may include writing the metadata entry (LBA, size) to the first free location closest to the second end of the current segment. Alternatively, this may include writing the metadata entry to the first free location in an index page 328 that has room for it or creating a new index page 328 located adjacent a previous index page 328. Steps 410, 412 may include updating one or more pointers or table that indicates an amount of space available in the physical segment, such as a pointer 320 to the first free address closest to the first end and a pointer 322 to the first free address closest to the second end, which may be the first free address before the last index page 328 and/or the first free address in the last index page. In particular, these pointers may be maintained as the data offset 320 and metadata offset in the segment map 314 for the current PSID 316.

The method 400 may further include updating 416 the block map 338 for the current snapshot. In particular, for each LBA 332 referenced in the write request, an entry in the block map 338 for that LBA 332 may be updated to reference the current PSID 316. A write request may write to a range of LBAs 332. Accordingly, the entry for each LBA 332 in that range may be updated to refer to the current PSID 316.

Updating the block map 338 may include evaluating 414 whether an entry for a given LBA 332 referenced in the write request already exists in the block map 338. If so, then that entry is overwritten 418 to refer to the current PSID 316. If not, an entry is updated 416 in the block map 318 that maps the LBA 332 to the current PSID 316. In this manner, the block map 338 only references LBAs 332 that are actually written to, which may be less than all of the LBAs 332 of a storage volume or slice. In other embodiments, the block map 338 is of fixed size and includes an entry for each LBA 332 regardless of whether it has been written to previously. The block map 338 may also be updated to include the physical offset 334 within the current segment to which the data 326 from the write request was written.

In some embodiments, the storage node 106 may execute multiple write requests in parallel for the same LBA 332. Accordingly, it is possible that a later write can complete first and update the block map 338 whereas a previous write request to the same LBA 332 completes later. The data of the previous write request is therefore stale and the block map 338 should not be updated.

Suppressing of updating the block map 338 may be achieved by using the VSIDs 318 and physical offset 334. When executing a write request for an LBA, the VSID 318 mapped to the segment 324 and the physical offset 334 to which the data is to be, or was, written may be compared to the VSID 318 and offset 334 corresponding to the entry in the block map 338 for the LBA 332. If the VSID 318 mapped in the segment map 314 to the PSID 316 in the entry of the block map 338 corresponding to the LBA 332, then the block map 338 will not be updated. Likewise, if the VSID 318 corresponding to the PSID 316 in the block map 338 is the same as the VSID 318 for the write request and the physical offset 334 in the block map 338 is higher than the offset 334 to which the data of the write request is to be or was written, the block map 338 will not be updated for the write request.

As a result of steps 414-418, the block map 338 only lists the PSID 316 where the valid data for a given LBA 332 is stored. Accordingly, only the index pages 328 of the physical segment 324 mapped to the PSID 316 listed in the block map 338 need be searched to find the data for a given LBA 332. In instances where the physical offset 334 is stored in the block map 338, no searching is required.

FIG. 5 illustrates a method 500 executed by a storage node 106 in response to the new snapshot instruction of step 210 for a storage volume. The method 500 may be executed in response to an explicit instruction to create a new snapshot or in response to a write request that includes a new snapshot ID 340. The method 500 may also be executed with respect to a current snapshot that is still being addressed by new write requests. For example, the method 500 may be executed periodically or be triggered based on usage.

The method 500 may include allocating 502 a new PSID 316 and its corresponding physical segment 324 as the current PSID 316 and current segment for the storage volume, e.g., by including a slice ID 310 corresponding to a volume ID 312 and offset 304 included in the new snapshot instruction or the write request referencing the new snapshot ID 340. Allocating 502 a new segment may include updating 504 an entry in the segment map 314 that maps the current PSID 316 to the snapshot ID 340 and a slice ID 310 corresponding to a volume ID 312 and offset 304 included in the new snapshot instruction.

As noted above, when a PSID 316 is allocated, the VSID 318 for that PSID 316 will be a number higher than all VSIDs 318 previously assigned to that volume ID 312, and possibly to that slice ID 310 (where slices have separate series of VSIDs 318). The snapshot ID 340 of the new snapshot may be included in the new snapshot instruction or the storage node 106 may simply assign a new snapshot ID that is the previous snapshot ID 340 plus one.

The method 500 may further include finalizing 506 and performing garbage collection with respect to PSIDs 316 mapped to one or more previous snapshots IDs 340 for the volume ID 312 in the segment map 314, e.g., PSIDs 316 assigned to the snapshot ID 340 that was the current snapshot immediately before the new snapshot instruction was received.

FIG. 6 illustrates a method 600 for finalizing and performing garbage collection with respect to segment IDs 340 for a snapshot ("the subject snapshot"), which may include the current snapshot or a previous snapshot. The method 600 may include marking 602 as valid latest-written data for an LBA 332 in the PSID 316 having the highest VSID 318 in the segment map 314 and to which data was written for that LBA 332. Marking 602 data as valid may include making an entry in a separate table that lists the location of valid data or entries for metadata in a given physical segment 324 or setting a flag in the metadata entries stored in the index pages 328 of a physical segment 324, e.g., a flag that indicates that the data referenced by that metadata is invalid or valid.

Note that the block map 338 records the PSID 316 for the latest version of the data written to a given LBA 332. Accordingly, any references to that LBA 332 in the physical segment 324 of a PSID 316 mapped to a lower-numbered VSID 318 may be marked 604 as invalid. For the physical segment 324 of the PSID 316 in the block map 338 for a given LBA 332, the last metadata entry for that LBA 332 may be found and marked as valid, i.e. the last entry referencing the LBA 332 in the index page 328 that is the last index page 328 including a reference to the LBA 332. Any other references to the LBA 332 in the physical segment 324 may be marked 604 as invalid. Note that the physical offset 334 for the LBA 332 may be included in the block map 334, so all metadata entries not corresponding to that physical offset 334 may be marked as invalid.

The method 600 may then include processing 606 each segment ID S of the PSIDs 316 mapped to the subject snapshot according to steps 608-620. In some embodiments, the processing of step 606 may exclude a current PSID 316, i.e. the last PSID 302 assigned to the subject snapshot. As described below, garbage collection may include writing valid data from a segment to a new segment. Accordingly, step 606 may commence with the PSID 316 having the lowest-valued VSID 318 for the subject snapshot. As any segments 324 are filled according to the garbage collection process, they may also be evaluated to be finalized or subject to garbage collection as described below.

The method 600 may include evaluating 608 whether garbage collection is needed for the segment ID S. This may include comparing the amount of valid data in the physical segment 324 for the segment ID S to a threshold. For example, if only 40% of the data stored in the physical segment 324 for the segment ID S has been marked valid, then garbage collection may be determined to be necessary. Other thresholds may be used, such as value between 30% and 80%. In other embodiments, the amount of valid data is compared to the size of the physical segment 324, e.g., the segment ID S is determined to need garbage collection if the amount of valid data is less than X % of the size of the physical segment 324, where X is a value between 30 and 80, such as 40.

If garbage collection is determined 608 not to be needed, the method 600 may include finalizing 610 the segment ID S. Finalizing may include flagging the segment ID S in the segment map 314 as full and no longer available to be written to. This flag may be stored in another table that lists finalized PSIDs 316.

If garbage collection is determined 608 to be needed, then the method 600 may include writing 612 the valid data to a new segment. For example, if the valid data may be written to a current PSID 316, i.e. the most-recently allocated PSID 316 for the subject snapshot, until its corresponding physical segment 324 full. If there is no room in the physical segment 324 for the current PSID 316, step 612 may include assigning a new PSID 316 as the current PSID 316 for the subject snapshot. The valid data, or remaining valid data, may then be written to the physical segment 324 corresponding to the current PSID 316 for the subject snapshot.

Note that writing 612 the valid data to the new segment maybe processed in the same manner as for any other write request (see FIG. 4) except that the snapshot ID used will be the snapshot ID 340 of the subject snapshot, which may not be the current snapshot ID. In particular, the manner in which the new PSID 316 is allocated to the subject snapshot may be performed in the same manner described above with respect to steps 406-48 of FIG. 4. Likewise, the manner in which the valid data is written to the current segment may be performed in the same manner as for steps 410-412 of FIG. 4. In some embodiments, writing of valid data to a new segment as part of garbage collection may also include updating the block map with the new location of the data for an LBA 332, such as according to steps 414-418 of FIG. 4. When the physical segment 324 of the current PSID 316 is found to be full, it may itself be subject to the process 600 by which it is finalized or subject to garbage collection.

After the valid data is written to a new segment, the method 600 may further include freeing 614 the PSID S in the segment map 314, e.g., marking the entry in segment map 314 corresponding to PSID S as free.

The process of garbage collection may be simplified for PSIDs 316 that are associated with the subject snapshot in the segment map 314 but are not listed in the block map 338 with respect to any LBA 332. The physical segments 324 of such PSIDs 316 do not store any valid data. Entries for such PSIDs 316 in the segment map 314 may therefore simply be deleted and marked as free in the segment map 314

Figure 7:
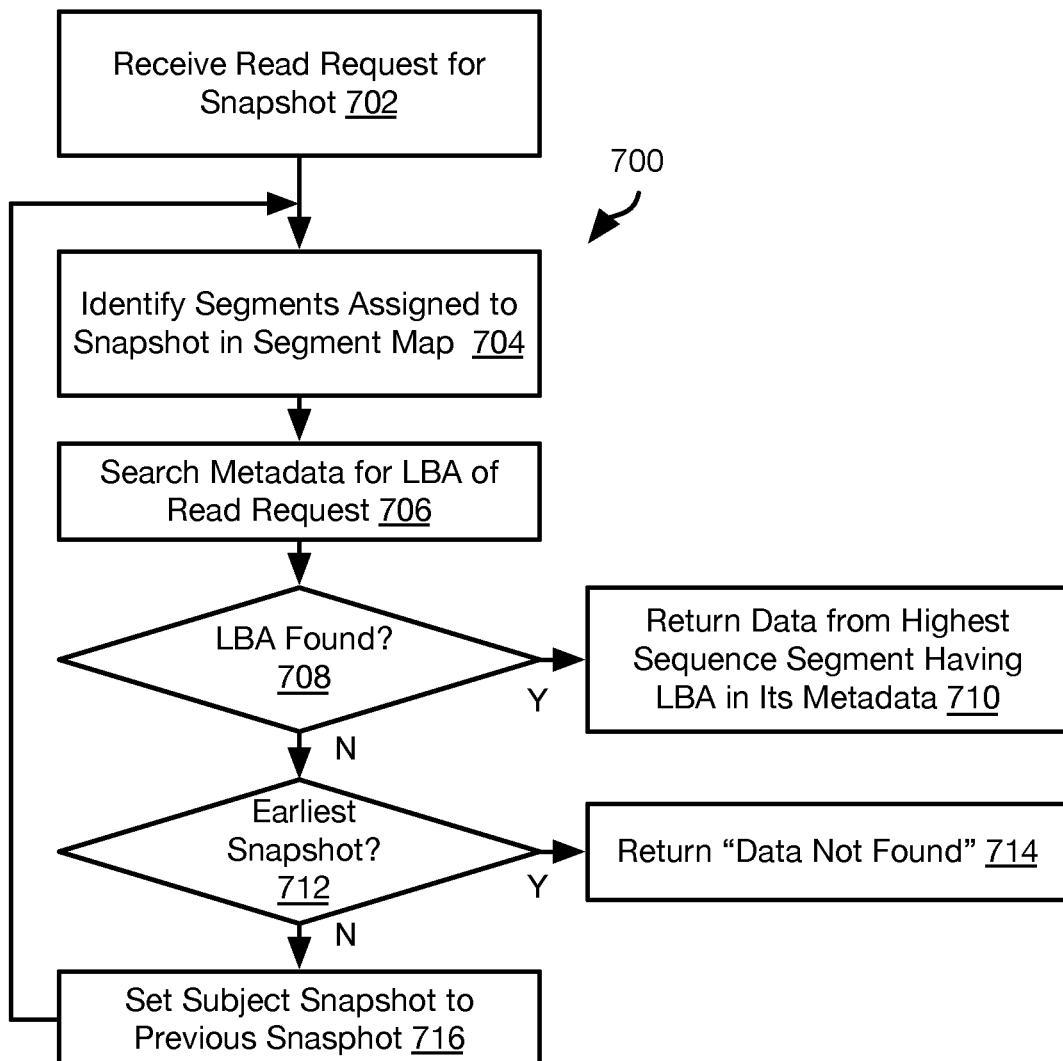
FIG. 7 is a process flow diagram of a method for reading data from a snapshot in accordance with an embodiment of the present invention.

FIG. 7 illustrates a method 700 that may be executed by a storage node 106 in response to a read request. The read request may be received from an application executing on a compute node 110. The read request may include such information as a snapshot ID, volume ID (and/or slice ID), LBA, and size (e.g. number of 4 KB blocks to read).

The following steps of the method 700 may be initially executed using the snapshot ID 340 included in the read request as "the subject snapshot," i.e., the snapshot that is currently being processed to search for requested data. The method 700 includes receiving 702 the read request by the storage node 106 and identifying 704 one or more PSIDs 316 in the segment map 314 assigned to the subject snapshot and searching 706 the metadata entries for these PSIDs 316 for references to the LBA 332 included in the read request.

The searching of step 706 may be performed in order of decreasing VSID 318, i.e. such that the metadata entries for the last allocated PSID 316 is searched first. In this manner, if reference to the LBA 332 is found, the metadata of any previously-allocated PSIDs 316 does not need to be searched.

Searching 706 the metadata for a PSID 316 may include searching one or more index pages 328 of the physical segment 324 corresponding to the PSID 316. As noted above, one or more index pages 328 are stored at the second end of the physical segment 324 and entries are added to the index pages 328 in the order they are received. Accordingly, the last-written metadata including the LBA 332 in the last index page 328 (furthest from the second end of the physical segment 324) in which the LBA 332 is found will correspond to the valid data for that LBA 332. To locate the data 326 corresponding to the last-written metadata for the LBA 332 in the physical segment 324, the sizes 336 for all previously-written metadata entries may be summed to find a start address in the physical segment 324 for the data 326. Alternatively, if the physical offset 334 is included, then the data 326 corresponding to the metadata may be located without summing the sizes 336.

If reference to the LBA 332 is found 708 in the physical segment 324 for any of the PSIDs 316 allocated to the subject snapshot, the data 326 corresponding to the last-written metadata entry including that LBA 332 in the physical segment 324 mapped to the PSID 316 having the highest VSID 318 of all PSIDs 316 in which the LBA is found will be returned 710 to the application that issued the read request.

If the LBA 332 is not found in the metadata entries for any of the PSIDs 316 mapped to subject snapshot, the method 700 may include evaluating 712 whether the subject snapshot is the earliest snapshot for the storage volume of the read request on the storage node 106. If so, then the data requested is not available to be read and the method 700 may include returning 714 a "data not found" message or otherwise indicating to the requesting application that the data is not available.

If an earlier snapshot than the subject snapshot is present for the storage volume on the storage node 106, e.g., there exists at least one PSID 316 mapped to a snapshot ID 340 that is lower than the snapshot ID 340 of the subject snapshot ID, then the immediately preceding snapshot ID 340 will be set 716 to be the subject snapshot and processing will continue at step 704, i.e. the PSIDs 316 mapped to the subject snapshot will be searched for the LBA 332 in the read request as described above.

The method 700 is particularly suited for reading data from snapshots other than the current snapshot that is currently being written to. In the case of a read request from the current snapshot, the block map 338 may map each LBA 332 to the PSID 316 in which the valid data for that LBA 332 is written. Accordingly, for such embodiments, step 704 may include retrieving the PSID 332 for the LBA 332 in the write request from the block map 338 and only searching 706 the metadata corresponding to that PSID 316. Where the block map 338 stores a physical offset 334, then the data is retrieved from that physical offset within the physical segment 314 of the PSID 336 mapped to the LBA 332 of the read request.

In some embodiments, the block map 332 may be generated for a snapshot other than the current snapshot in order to facilitate executing read requests, such as where a large number of read requests are anticipated in order to reduce latency. This may include searching the index pages 328 of the segments 324 allocated to the subject snapshot and its preceding snapshots to identify, for each LBA 332 to which data has been written, the PSID 316 having the highest VSID 318 of the PSIDs 316 having physical segments 324 storing data written to the each LBA 332. This PSID 316 may then be written to the block map 318 for the each LBA 332. Likewise, the physical offset 334 of the last-written data for that LBA 332 within the physical segment 324 for that PSID 316 may be identified as described above (e.g., as described above with respect to steps 704-716).

Figure 8:
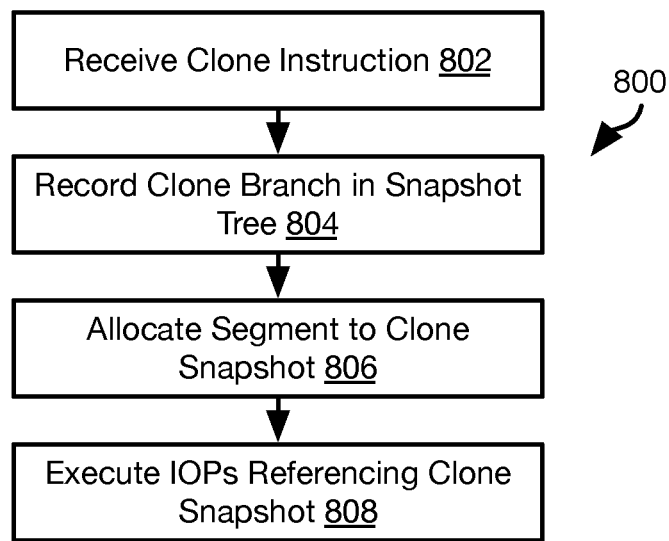
FIG. 8 is a process flow diagram of a method for cloning a snapshot in accordance with an embodiment of the present invention.

Referring to FIG. 8, in some instances it may be beneficial to clone a storage volume. This may include capturing a current state of a principal copy of a storage volume and making changes to it without affecting the principal copy of the storage volume. For purposes of this disclosure a "principal copy" or "principal snapshot" of a storage volume refers to an actual production copy that is part of a series of snapshots that is considered by the user to be the current, official, or most up-to-date copy of the storage volume. In contrast, a clone volume is a snapshot created for experimentation or evaluation but changes to it are not intended by the user to become part of the production copy of the storage volume. Stated differently, only one snapshot may be a principal snapshot with respect to an immediately preceding snapshot, independent of the purpose of the snapshot. Any other snapshots that are immediate descendants of the immediately preceding snapshot are snapshots of a clone volume.

The illustrated method 800 may be executed by the storage manager 102 and one or more storage nodes 106 in order to implement this functionality. The method 800 may include receiving 802 a clone instruction and executing the remaining steps of the method 800 in response to the clone instruction. The clone instruction may be received by the storage manager 102 from a user or be generated according to a script or other program executing on the storage manager 102 or a remote computing device in communication with the storage manager 102.

Figure 9:
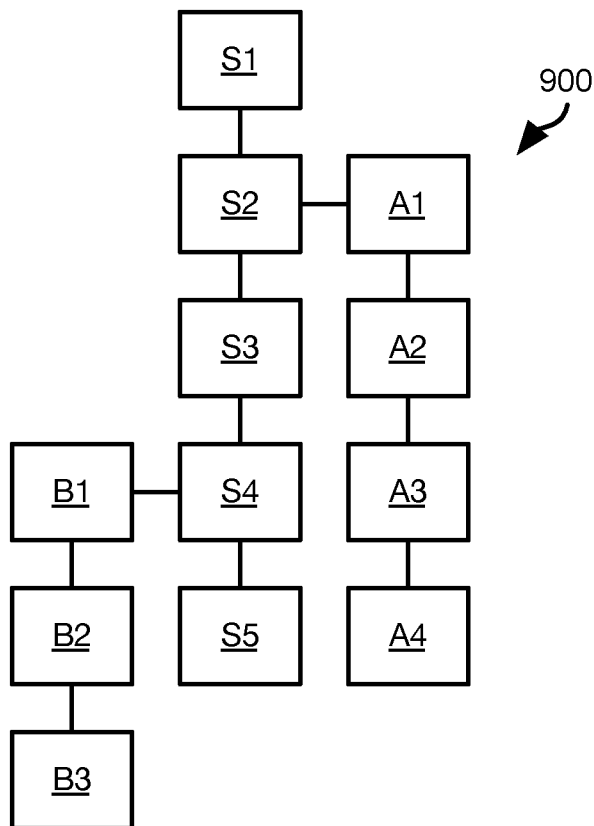
FIG. 9 illustrates a snapshot hierarchy created in accordance with an embodiment of the present invention.

The method 800 may include recording 804 a clone branch in a snapshot tree. For example, referring to FIG. 9, in some embodiments, for each snapshot that is created for a storage volume, the storage manager 102 may create a node S1-S5 in a snapshot hierarchy 900. In response to a clone instruction, the storage manager 102 may create a clone volume and branch to a node A1 representing the clone volume. In the illustrated example, a clone instruction was received with respect to the snapshot of node S2. This resulted in the creation of a clone volume represented by node A1 that branches from node S2. Note node S3 and its descendants are also connected to node S2 in the hierarchy.

In some embodiments, the clone instruction may specify which snapshot the clone volume is of. In other embodiments, the clone instruction may be inferred to be a snapshot of a current snapshot. In such embodiments, a new principal snapshot may be created and become the current snapshot. The previous snapshot will then be finalized and be subject to garbage collection as described above. The clone will then branch from the previous snapshot. In the illustrated example, if node S2 represented the current snapshot, then a new snapshot represented by node S3 would be created. The snapshot of node S2 would then be finalized and subject to garbage collection and the snapshot of the clone volume represented by A1 would be created and node A1 would be added to the hierarchy as a descendent of node S2.

In some embodiments, the clone node A1, and possibly its descendants A2 to A4 (representing subsequent snapshots of the clone volume), may be distinguished from the nodes S1 to S5 representing principal snapshots, such as by means of a flag, a classification of the connection between the node A1 and node S2 that is its immediate ancestor, or by storing data defining node A1 in a separate data structure.

Following creation of a clone volume, other principal snapshots of the storage volume may be created and added to represented in the hierarchy by one or more nodes S2 to S5. A clone may be created of any of these snapshots and represented by additional clone nodes. In the illustrated example, node B1 represents a snapshot of a clone volume that is a clone of the snapshot represented by node S4. Subsequent snapshots of the clone volume are represented by nodes B1 to B3.

Referring again to FIG. 8, the creation of a snapshot for a clone volume on the storage node 106 may be performed in the identical manner as for any other snapshot, such as according to the methods of FIGS. 2 through 6. In particular, one or more segments 806 may be allocated to the clone volume on storage nodes 106 storing slices of the cloned storage volume and mapped to the clone volume. IOPs referencing the clone volume may be executed 808, such as according to the method 400 of FIG. 4.

In some instances, it may be desirable to store snapshots of a clone volume on a different storage node 106 than the principal snapshots. Accordingly, the method 800 may include allocating 806 segments to the clone volume on the different storage node 106. This may be invoked by sending a new snapshot instruction referencing the clone volume (i.e., an identifier of the clone volume) to the different storage node 106 and instructing one or more compute nodes 110 to route IOPs for the clone volume to the different storage node 106.

The storage node 102 may store in each node of the hierarchy, data identifying one or more storage nodes 106 that store data for the snapshot represented by that node of the hierarchy. For example, each node may store or have associated therewith one or more identifiers of storage nodes 106 that store a particular snapshot ID for a particular volume ID. The node may further map one or more slice IDs (e.g., slice offsets) of a storage volume to one storage nodes 106 storing data for that slice ID and the snapshots for that slice ID.

Figure 10:
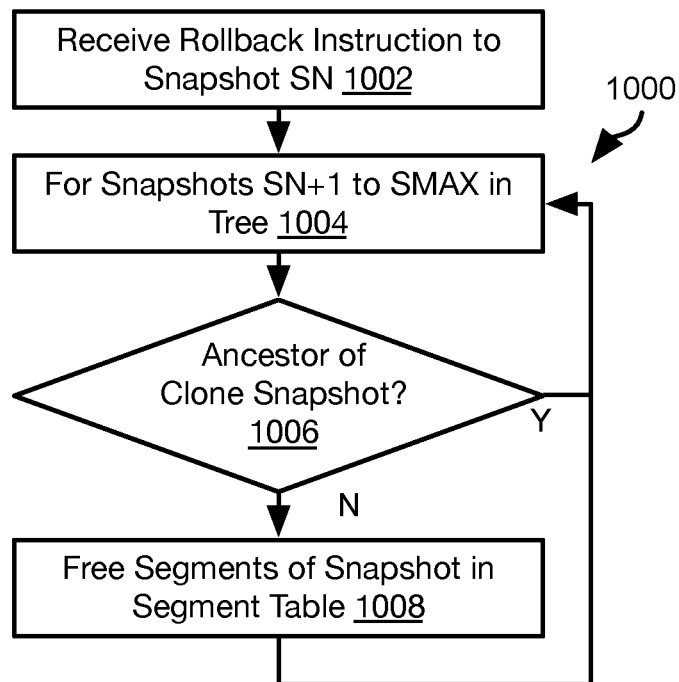
FIG. 10 is a process flow diagram of a method for rolling back to a prior snapshot in accordance with an embodiment of the present invention.

Referring to FIG. 10, one of the benefits of snapshots is the ability to capture the state of a storage volume such that it can be restored at a later time. FIG. 10 illustrates a method 1000 for rolling back a storage volume to a previous snapshot, particularly for a storage volume having one or more clone volumes.

The method 1000 includes receiving 1002, by the storage manager 102, an instruction to rollback a storage volume to a particular snapshot SN. The method 1000 may then include processing 1004 each snapshot that is a represented by a descendent node of the node representing snapshot SN in the snapshot hierarchy, i.e. snapshots SN+1 to SMAX, where SMAX is the last principal snapshot that is a descendent of snapshot SN (each "descendent snapshot"). For each descendent snapshot, processing 1004 may include evaluating 1006 whether the each descendent is an ancestor of a node representing a snapshot of a clone volume. If not, then the storage manager 102 may instruct all storage nodes 106 storing segments mapped to the descendent snapshot to free 1008 these segments, i.e. delete entries from the segment map referencing the descendent snapshot and marking corresponding PSIDs 316 as free in the segment map 314.

If the descendent snapshot is found 1006 to be an ancestor of a snapshot of a clone volume, then step 1008 is not performed and the snapshot and any segments allocated to it are retained.

Figure 11:
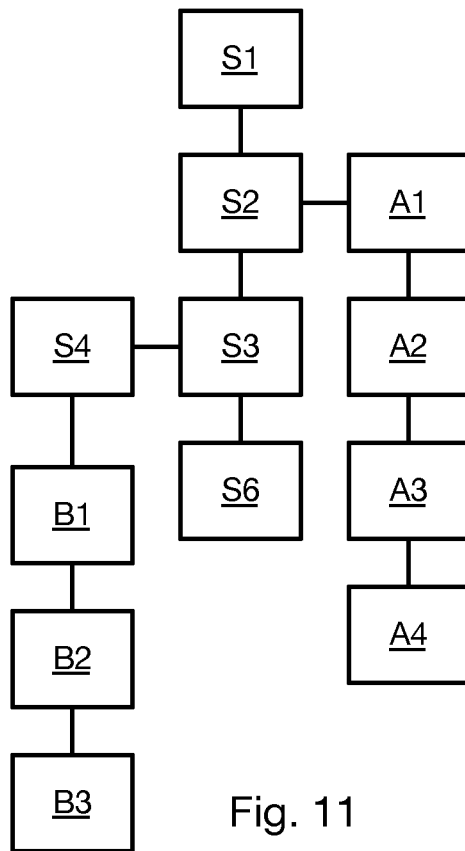
FIG. 11 illustrates the snapshot hierarchy of FIG. 9 as modified according to the method of FIG. 10 in accordance with an embodiment of the present invention.

FIG. 11 illustrates the snapshot hierarchy following execution of the method 1000 with respect to the snapshot represented by node S3. As is apparent, snapshot S5 has been removed from the hierarchy and any segments corresponding to these snapshots will have been freed on one or more storage nodes 106.

However, since node S4 is an ancestor of clone node B1, it is not removed and segments corresponding to it are not freed on one or more storage nodes in response to the roll back instruction. Inasmuch as each snapshot contains only data written to the storage volume after it was created, previous snapshots may be required to recreate the storage volume. Accordingly, the snapshots of nodes S3 to S1 are needed to create the snapshot of the storage volume corresponding to node B1.

Subsequent principal snapshots of the storage volume will be added as descendants of the node to which the storage volume was rolled back. In the illustrated example, a new principal snapshot is represented by node S6 that is an immediate descendent of node S3. Node S4 is only present due to clone node B1 and therefore may itself be classified as a clone node in the hierarchy in response to the rollback instruction of step 1002.

Note that FIG. 11 is a simple representation of a hierarchy. There could be any number of clone volumes, snapshots of clone volumes, clones of clone volumes and descendent snapshots of any snapshots of any clone volume represented by nodes of a hierarchy. Accordingly, to roll back to a particular snapshot of a clone, the method 1000 is the same, except that descendants of a snapshot of a clone volume are treated the same as principal snapshots and clones of any of these descendants are treated the same as a snapshot of a clone volume.

Figure 12:
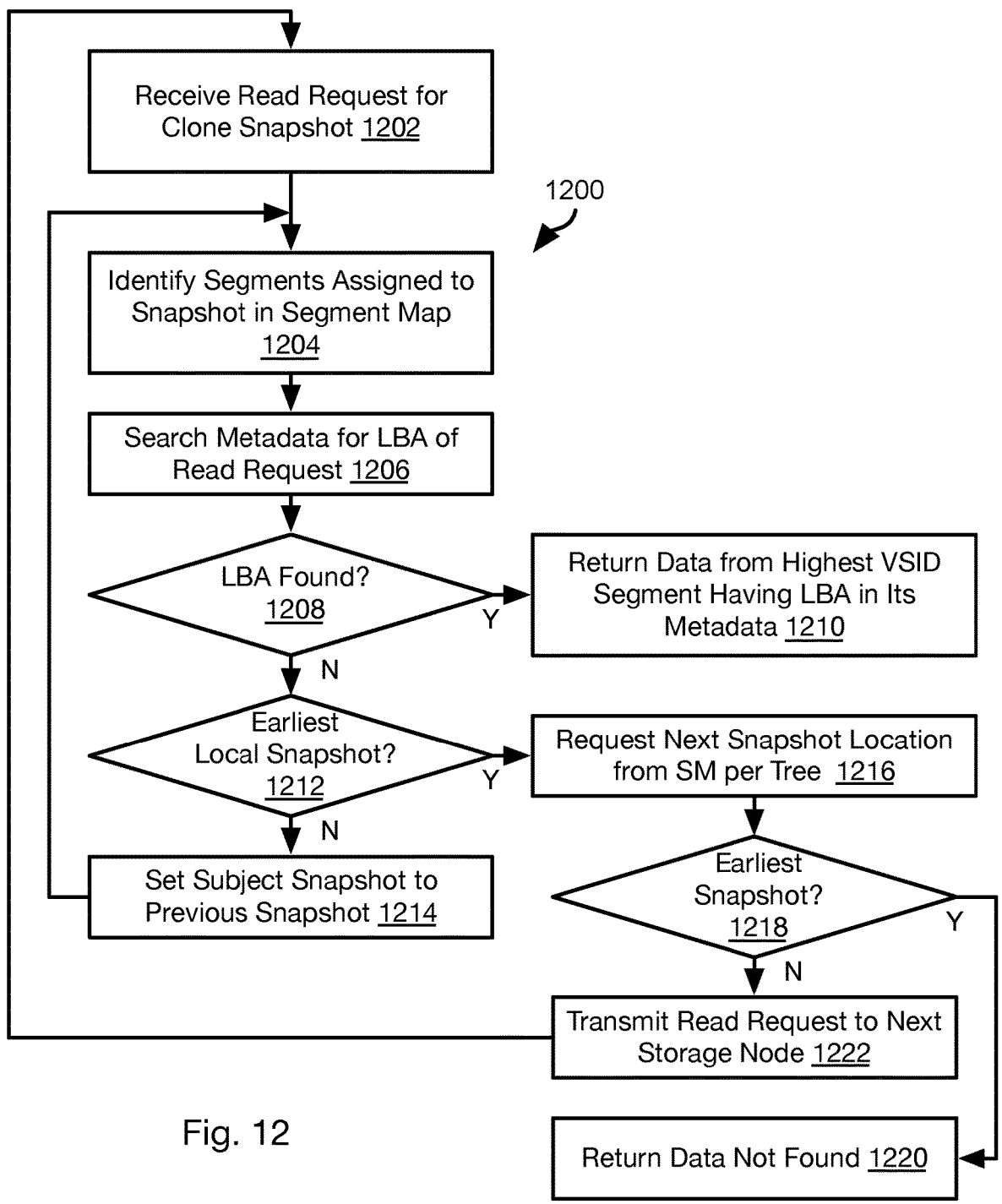
FIG. 12 is a process flow diagram of a method for reading from a clone volume in accordance with an embodiment of the present invention.

Referring to FIG. 12, the illustrated method 1200 may be used to execute a read request with respect to a storage volume that is represented by a hierarchy generated as described above with respect to FIGS. 8 through 11. The illustrated method 1200 may also be executed with respect to a storage volume that includes only principal snapshots that are distributed across multiple storage nodes, i.e., all the segments corresponding to snapshots of the same slice of the storage volume are not located on the same storage node 106. In that case, the hierarchy stored on the storage manager 102 stores the location of the segments for each snapshot and therefore enables them to be located.

The method 1200 may be executed by a storage node 106 ("the current storage node") with information retrieved from the storage manager 102 as noted below. The method 1200 may include receiving 1202 a read request, which may include such information as a snapshot ID, volume ID (and/or slice ID), LBA, and size (e.g. number of 4 KB blocks to read).

Note that the read request may be issued by an application executing on a compute node 110. The compute node 110 may determine which storage node 106 to transmit the read request using information from the storage manager 102. For example, the compute node 110 may transmit a request to obtain an identifier for the storage node 102 storing data for a particular slice and snapshot of a storage volume. The storage manager may then obtain an identifier and/or address for the storage node 106 storing that snapshot and slice of the storage volume from the hierarchical representation of the storage volume and return it to the requesting compute node 110. For example, the storage manager 102 may retrieve this information from the node in the hierarchy representing the snapshot included in the read request.

In response to the read request, the current storage node performs the algorithm illustrated by subsequent steps of the method 1200. In particular, the method 1200 may include identifying 1204 segments assigned to the snapshot ID of the read request in the segment ("the subject snapshot").

The method 1200 may include searching 1206 the metadata of the segments identified in step 1204 for the LBA of the read request. If the LBA is found, the data from the highest numbered segment having the LBA in its metadata is returned, i.e. the data that corresponds to the last-written metadata entry including the LBA.

If the LBA is not found in any of the segments mapped to subject snapshot, then the method 1200 may include evaluating 1212 whether the subject snapshot is the earliest snapshot on the current storage node. If not, then steps processing continues at step 1204 with the previous snapshot set 1214 as the subject snapshot.

Steps 1204-1214 may be performed in the same manner as for steps 704-714 of the method 700, including the various modifications and variations described above with respect to the method 700.

In contrast to the method 700, if the LBA is not found in any of the segments corresponding to the subject snapshot for any of the snapshots evaluated, then the method 1200 may include requesting 1216 a location, e.g. storage node identifier, where an earlier snapshot for the volume ID or slice ID is stored. In response to this request, the storage manager 102 determines an identifier of a storage node 106 storing the snapshot corresponding to the immediate ancestor of the earliest snapshot stored on the current storage node in the hierarchy. The storage manager 102 may determine an identifier of the storage node 106 relating to the immediate-ancestor snapshot and that stores data for a slice ID and volume ID of the read request as recorded for the ancestor nearest ancestor node in the hierarchy of the node corresponding to the earliest snapshot stored on the current storage node.

If the current storage node is found 1218 to be the earliest snapshot for the storage volume ID and/or slice ID of the read request, then the data the storage manager 102 may report this fact to the storage node, which will then return 1220 a message indicating that the requested LBA is not available for reading, such as in the same manner as step 714 of the method 700.

If another storage node stores an earlier snapshot for the volume ID and/or slice ID of the read request, then the read request may be transmitted 1222 to this next storage node by either the current storage node or the storage manager 102. The processing may then continue at step 1202 with the next storage node as the current storage node. The read request transmitted at step 1222 may have a snapshot ID set to the latest snapshot ID for the storage volume ID and or slice ID of the original read request.

The method 1200 may be performed repeatedly across multiple storage nodes 106 until the earliest snapshot is encountered or the LBA of the read request is located.

Figure 13:
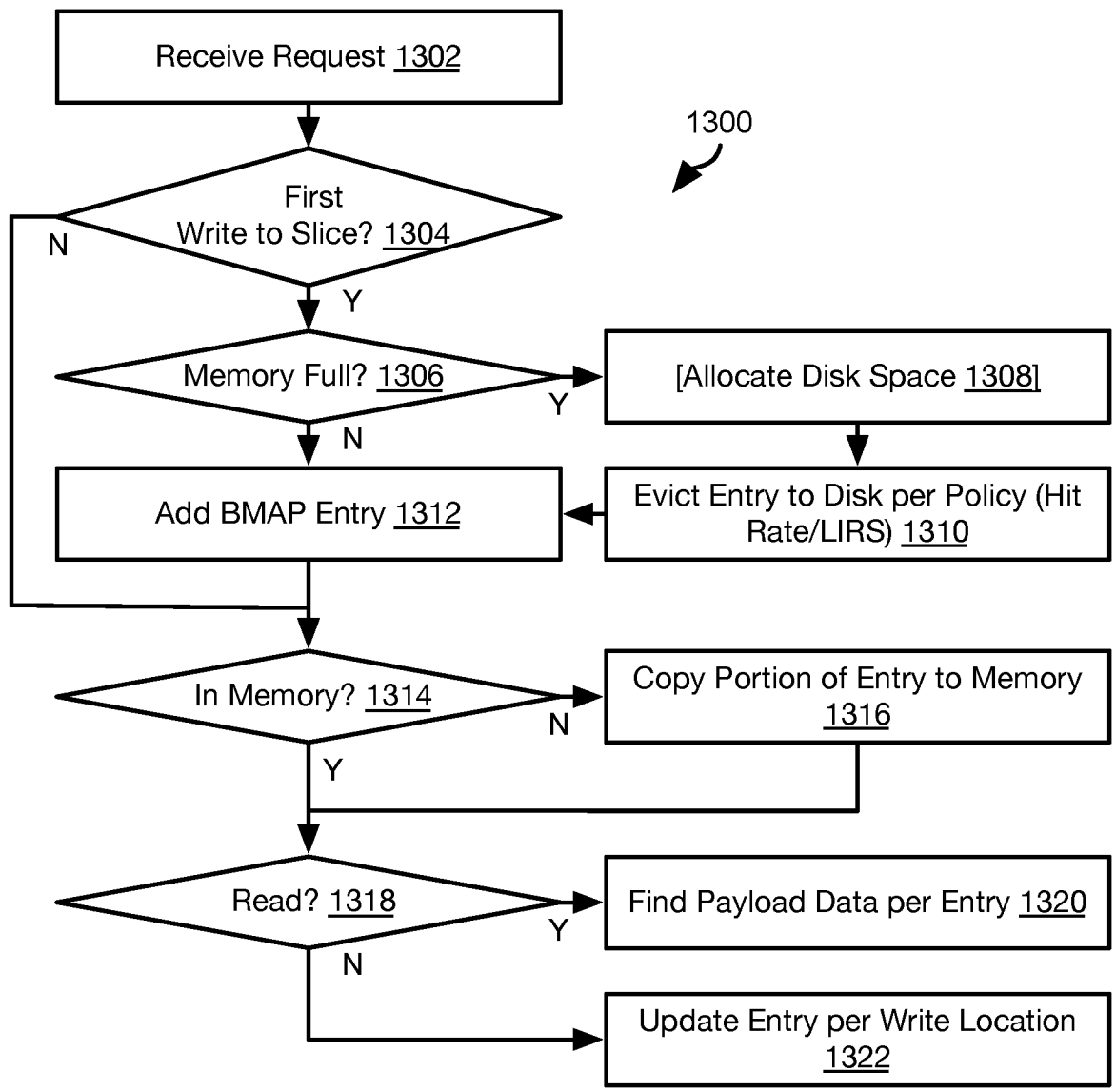
FIG. 13 is a process flow diagram of a method for implementing a block map cache in accordance with an embodiment of the present invention.

Referring to FIG. 13, as described with respect to FIG. 3, each slice may have a corresponding block map 338 that lists, for each LBA 332 of the block map, the PSID 316 of the segment in which the last-written data for that LBA 332 is written. The following description is made with respect to slices of storage volumes represented by a block map 338. It shall be understood that this is a logical storage unit such that any logical storage unit could be used in place of the slice of a storage volume as described below. Likewise, the block maps 338 as processed according to the methods described below may be for a specific snapshot of a slice.

As also noted above, the entry of an LBA 332 may also record the physical offset (PO) 334 within that segment 324 at which the last-written data is written. As also noted above, the segment map 314 and slice map 308 maps each PSID 316 to the volume ID 312 and slice (offset 304) of the volume ID 312 to which that PSID 316 is assigned. Entries of the segment map 314 may further map a VSID 318 that increases monotonically for the volume ID 312 or for the offset 304 and volume ID 312, as described above with respect to FIG. 3.

Many slices are written to the same storage node 106. The amount of memory occupied by the block maps 338 may become large and begin to degrade performance of the storage node 106. The illustrated method 1300 provides an improved approach for handling block maps 338 in order to improve the performance of the storage node 106.

The method 1300 may be executed by a computing device, such as a storage node 106, and includes receiving 1302 an IOP ("the subject IOP"). As discussed above the subject IOP may be a read IOP or write IOP. In either case, the IOP may reference a volume identifier, an offset (i.e., slice identifier), and an LBA for the data to be read or written by the IOP. The subject IOP may also reference a specific snapshot ID. A write IOP may further include payload data to be written.

The method 1300 may include evaluating 1304 whether the subject IOP is a first write IOP addressed to the slice identifier and volume identifier referenced by the subject IOP. Hereinafter "the subject slice" shall refer to the slice referenced by the slice identifier and volume identifier referenced by the subject IOP. If so, the method 1300 may include evaluating 1306 whether sufficient memory is available on the storage node 106 to create a new block map 338. For example, a configuration parameter on the storage node 106 may allocate an amount of memory that is available for use for block maps 338. If the amount of memory already occupied by block maps 338 on the storage is greater than some threshold portion (e.g., 80-100 percent) of that amount, the method 1300 may include evicting 1310 one or more block maps 338 to a disk, e.g. one of the storage device 108. If there is not storage allocated on one of the storage device 108 to which to write the evicted block maps 338, then one or more segments may be allocated 1308.

Evicting 1310 may be performed based on usage. For example, a time of access of each block map 338 may be maintained, i.e. when the block map 338 is used to read an entry for an LBA or update the entry for an LBA. Additionally or alternatively, a metric of a frequency of access of each block map 338 may be maintained, e.g., a number of accesses in the last N seconds or clock cycles, where N is a predetermined value. In either case, the evicted block map 338 may be a least recently used (LRU) block map 338 according to this metric, i.e. the block map 338 with the earliest time of last access or the lowest frequency of access. Alternatively, the block map 338 that is evicted may be selected based on a combination of time of last access and frequency of access relative to other block maps 338.

The block map 338 that is selected for eviction is then written to the storage allocated for evicted block maps and the memory occupied by the evicted block map 338 is freed.

Where the subject IOP is the first write for the subject slice, the method 1300 includes adding 1312 a BMAP (block map) entry to memory. In particular, each block map 338 for each slice of each volume identifier may be referred to as an entry in an in-memory cache of block maps. Accordingly, a BMAP entry may be created by allocating a portion of the cache to the block map 338 for the slice identifier and block identifier of the subject IOP.

If the BMAP entry for the subject slice has been previously evicted and is found 1314 not to be in memory, then some or all of the BMAP entry of the subject slice is copied 1316 from storage and written to memory. If this requires evicting another BMAP entry to free up space and/or allocating on-disk storage, this is done in the same manner as described above with respect to steps 1308 and 1310.

If the subject IOP is found 1318 to be a read IOP, then payload data for the subject slice and the LBA of the subject IOP is found 1320 according to the entry for that LBA in the BMAP entry for the subject slice and returned to the entity that generated the subject IOP, such as an application executing on the storage node 106 or a compute node 110. In particular, the PSID 316 and physical offset 334 are found for that LBA 332 of the subject IOP. The payload data is then read from that physical offset in the physical segment 324 corresponding to that PSID 316 as described above with respect to FIG. 7.

If the subject IOP is found 1318 to be a write IOP, then the payload data is written at a physical offset within a physical segment 324 and the LBA entry in the BMAP entry is updated 1322 to indicate the PSID 316 of that physical segment 324 and the physical offset to which the payload data was written. In particular, writing the payload data may be performed according to the method 400 of FIG. 4.

Figure 14:
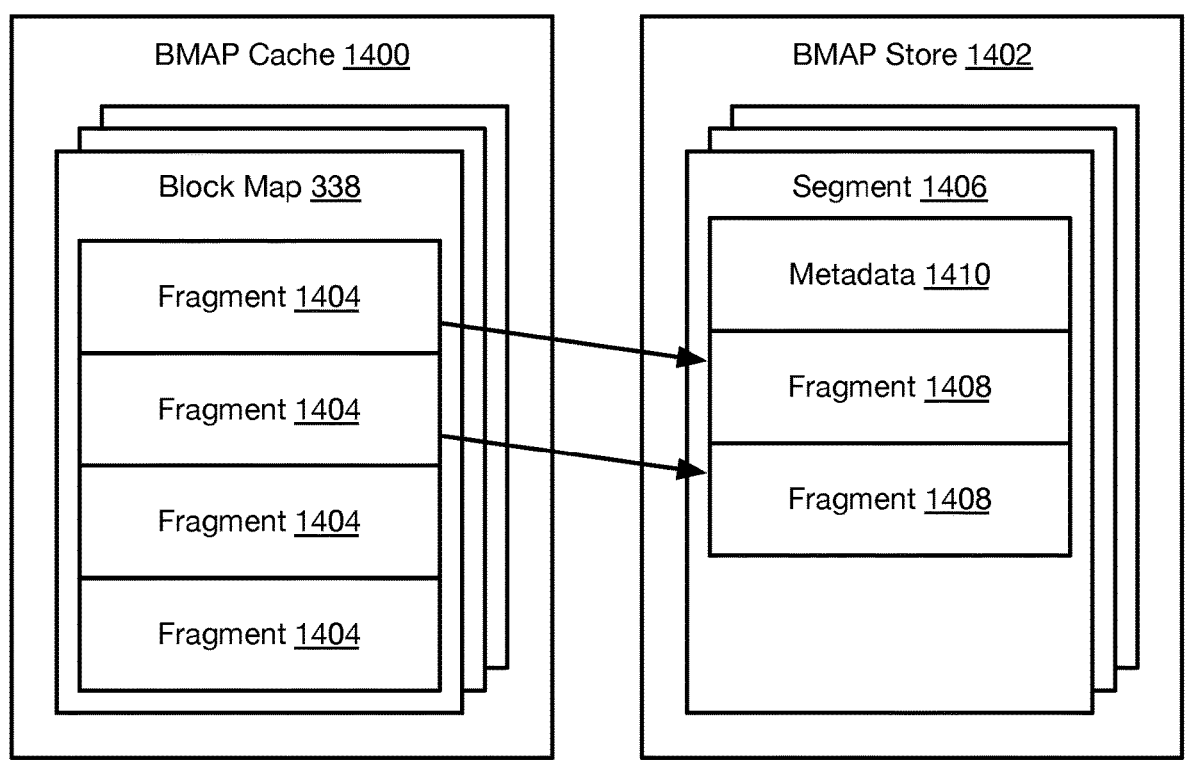
FIG. 14 is a schematic block diagram illustrating data structures for implementing a block map cache in accordance with an embodiment of the present invention.

Referring to FIG. 14, in some embodiments, a BMAP cache 1400 is maintained in memory and a corresponding BMAP store 1402 is maintained on a storage device to store evicted block maps 338. The BMAP cache 1400 and BMAP store 1402 may be maintained by a computing device, such as a storage node 106, as described below and in accordance with the method 1300.

The entries of a the BMAP cache 1400 in memory are block maps 338 that are divided into fragments 1404. For example, a block map for a slice may be between 3 and 34 MB in size depending on the amount of storage per slice. A fragment 1404 have a size on the order of 4 to 512 kB in size. The eviction of blocks to a BMAP store 1402 on a storage device 108 and the restoring of block maps from the BMAP store 1402 may be performed with respect to fragments 1404 as described below. The size of a fragment is a design choice. The larger the fragment the less flexibility is available to evict less-used portions of a block map but the processing overhead of managing the fragments decreases and the frequency at which fragments are evicted and restored also decreases.

When a block map 338 ("the subject map") for a slice ("the subject slice") is evicted to the BMAP store 1402, only those fragments 1404 for LBAs that have been written to in the subject slice are evicted and remaining memory allocated to the subject map is freed to be overwritten. For example, each fragment 1404 may correspond to a range of LBAs and may be defined by an offset that is the first LBA (lowest address) in the range of LBAs of the each fragment 1404. If no write requests have been received for LBAs in the range of LBAs for a fragment 1404, that fragment 1404 is not written to disk. If a write request has been received for one or more LBAs in the range of LBAs for a fragment, that fragment 1404 is written to disk. This may be implemented by, for example, maintaining a flag for each fragment 1404. If a write IOP is received that is addressed to an LBA of the slice corresponding to a fragment 1404, the flag may be set (e.g., changed to 1, or some other value). If the flag has been set, then the fragment 1404 will be written to the BMAP store 1402 when the block map 338 of that fragment 1404 is evicted. If the flag is not set, the fragment 1404 will not be written to the BMAP store 1402.

The BMAP store 1402 may be embodied as segments 106 of a storage device 108 of the storage node 106 that are allocated to the BMAP store 1402. For example, at step 1308, if disk space is needed to store an evicted block map 338, a segment 1406 may be allocated on a storage device 108 of the storage node. The fragments 1404 that are evicted may then written as fragments 1408 to a segment 1406 with space available. Each segment 1406 may have a corresponding metadata portion 1410 that is a portion of the segment reserved for writing metadata. Each time a fragment 1408 is written to a segment, the metadata 1410 is updated to include an entry for that fragment 1408. The metadata entry may include such information such as a volume identifier, slice identifier, fragment offset (first LBA in range of LBAs for the fragment 1408), snapshot identifier, or the like. The metadata entry may further include a segment offset that indicates a location within the segment 1406 where the fragment is written. To retrieve a fragment 1408, the metadata 1410 is searched to identify the entry corresponding to a slice identifier, volume identifier, and fragment offset for the fragment, the fragment 1408 is then read from the segment 1406 from the segment offset indicated in the metadata 1410.

As discussed below with respect to FIG. 17, the BMAP store 1402 may be used to restore the BMAP cache 1400 if the storage node is restarted. Accordingly, the entry in the metadata 1410 for each fragment 1408 may include a marker indicating where in a sequence of write instructions the fragment 1408 was written to the BMAP store 1402. For example, as discussed above, each time a segment 324 is allocated to a slice of a storage volume, that segment 324 is assigned the current value for a VSID counter for that storage volume (or for that slice of the storage volume) and the VSID counter is incremented. Accordingly, the marker may be the highest VSID 318 of those assigned to segments 324 allocated to the slice identifier and volume identifier for the block map 338 to which the fragment 1408 belongs at the time the fragment 1408 was evicted from the BMAP cache 1400. For example, the VSID counter may be read to obtain its current value either just prior or just after eviction such that no intervening allocations of segments 324 occur between when the VSID counter is read to obtain the value for the metadata 1410 and when the fragment 1408 is evicted. This may be accomplished by freezing allocations between reading and eviction.

Figure 15:
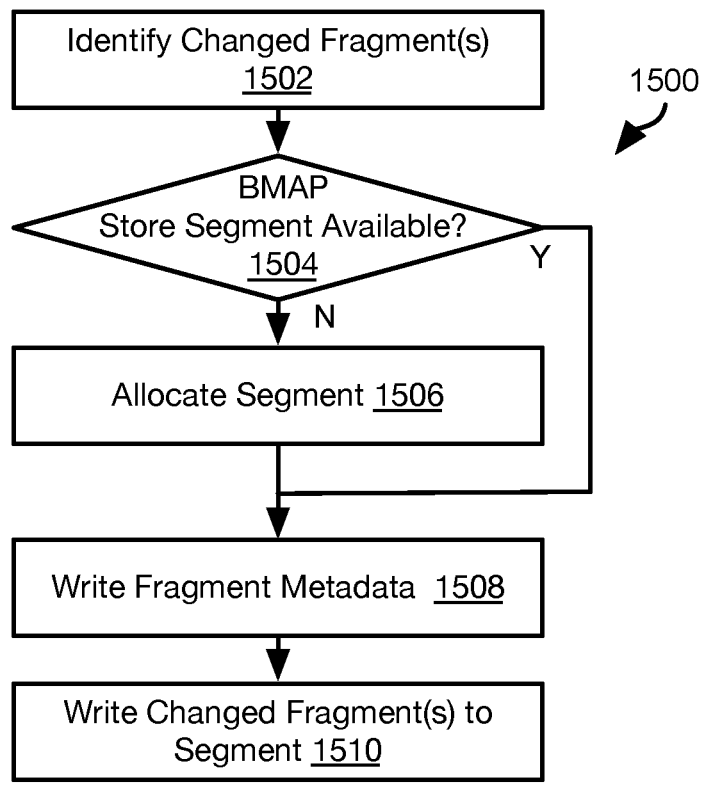
FIG. 15 is a process flow diagram of a method for performing fragment-based updates to a block map cache in accordance with an embodiment of the present invention.

FIG. 15 illustrates a method 1500 for writing fragments 1404 to the BMAP store 1402. After a fragment 1404 is written as a fragment 1408 to the BMAP store 1402, the memory in the BMAP cache 1400 occupied by the fragment 1404 is released to be overwritten. The method 1500 may be performed each time a block map 338 ("the subject block map") is evicted at step 1310 with respect to the fragments 1404 of the subject block map ("the subject fragments").

The method 1500 may include identifying 1502 those of the subject fragments that have changed, such as by evaluating whether flags for the subject fragments have been set as described above or by some other means, such as whether any of the entries for the LBAs of the subject fragments are non-zero, which presumes that the entries would be zeroed out when the BMAP cache entry is allocated for the subject block map.

In some instances, a subject fragment may have been evicted previously, then restored to the BMAP cache 1400 for reading without being changed. Accordingly, those fragments that were read from the BMAP store 1402 and restored to the BMAP cache 1400 and subsequently changed may be identified. For example, the flag for such fragments may be reset (e.g., to zero) when restored and then set (e.g., to 1) when the fragment is written to. Accordingly, changed fragments may be identified as having the flag set and restored fragments do not have the flag set and can be ignored.

The subsequent steps of the method 1500 may be performed separately for each of the subject fragments that is identified 1502 as having been changed ("the changed fragment").

The method 1500 may include evaluating 1504 whether a segment 1406 has space for the changed fragment to be written. If not, a new segment 1406 is allocated 1506 for the BMAP store 1402.

Metadata for the changed fragment is then written 1508 to the metadata 1410 of the available segment identified at step 1504 or as allocated at step 1506. The metadata may include the metadata written may be as described above with respect to FIG. 14. The changed fragment is then written 1510 to the available segment. The segment offset within the available segment 1406 to which the changed fragment is written may be included in the metadata written at step 1506 as described with respect to FIG. 14.

Figure 16:
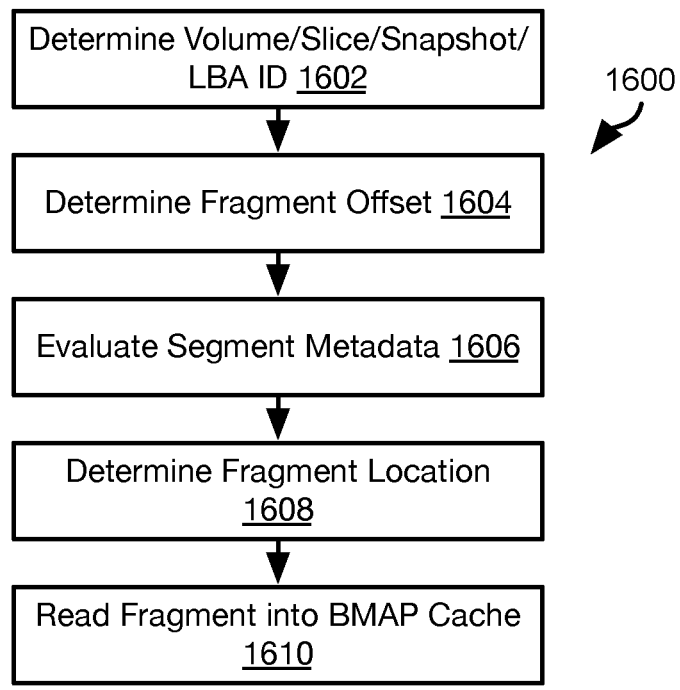
FIG. 16 is a process flow diagram of a method for reading a fragment of a block map cache from a disk in accordance with an embodiment of the present invention.

FIG. 16 illustrates a method 1600 for restoring a fragment 1410 (the restored fragment") from the BMAP store 1402 to the BMAP cache 1400. For example, the method 1600 may be executed at step 1316 of the method 1300 for the IOP being processed according to the method 1300 ("the subject IOP").

The method 1600 may include determining 1602 the volume identifier, slice identifier, and LBA indicated by the subject IOP. In some embodiments, the subject IOP may further indicate a snapshot identifier. Accordingly, this value, if any may be identified as well.

The method 1600 may further include identifying the fragment corresponding to the LBA of the subject IOP. As noted above, each fragment corresponds to a range of LBAs and the first LBA in that range indicates the offset within the slice at which the each fragment starts. Accordingly, for the LBA of the subject IOP the fragment offset of the fragment including that LBA may be determined 1604. In particular, the identified fragment will have an offset is less than the LBA of the subject IOP and the LBA of the subject IOP will be less than the offset of the fragment following the identified fragment.

The method 1600 may then include evaluating 1606 the metadata 1410 of the segments 1406 to identify a segment 1406 having metadata 1410 referencing the volume identifier, slice identifier, and fragment offset for the subject IOP. The segment offset is then determined 1608 from the metadata 1410 of that segment and the fragment at that segment is read from the segment offset within that segment and written 1610 to the BMAP cache 1400. In embodiments where fragments are mapped to particular snapshots, the metadata 1410 for a fragment may be written to include an identifier of a snapshot. Accordingly, evaluating 1606 the metadata may include identifying an entry that also matches the snapshot identifier included in the subject IOP.

Note that fragments may be written to the BMAP cache 1400 alone. That is to say that when a block map 338 for a particular slice is needed, the fragment that is needed may be read from the BMAP store 1402 into the BMAP cache 1400 alone rather than reading all fragments of that block map 338. Likewise, the fragments for the same slice of a volume need not be stored together in the BMAP store 1402.

Figure 17:
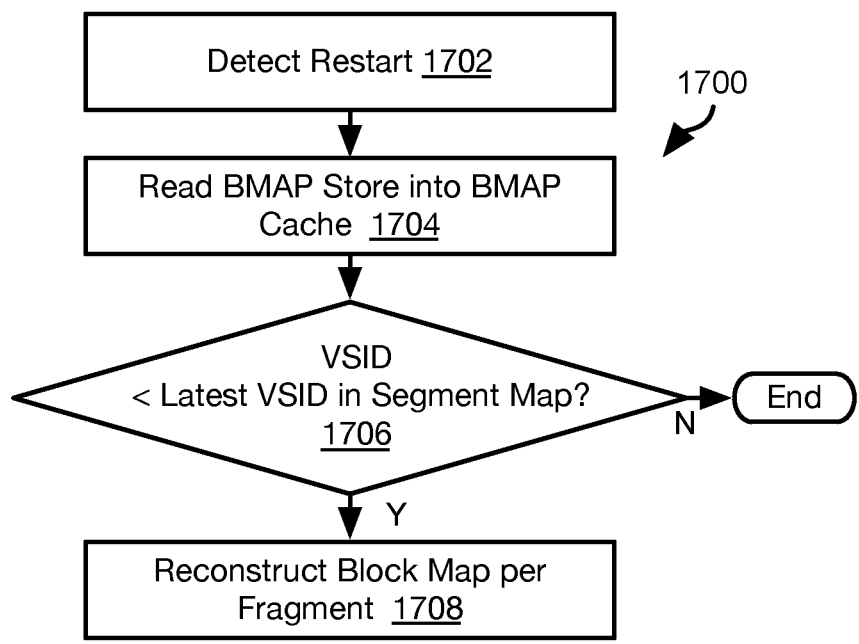
FIG. 17 is a process flow diagram of a method for reconstructing a block map in accordance with an embodiment of the present invention.

Referring to FIG. 17, in some embodiments, a storage node 106 may crash, and the BMAP cache 1400 may be lost. The block maps 338 may be recreated using the segment map 314 and the metadata in the index pages 328 of the segments 324. In particular, the segments assigned to a slice of a volume may be identified in the segment map 314 and the locations of data corresponding to the LBAs of the slice may be determined from the index pages 328. Where multiple writes are recorded for the same LBA, the VSIDs 318 of the segments indicate which segment is later thereby enabling the current data to be identified as the last written data to the segment with the highest VSID that references the LBA. The last written data in a segment 324 may be determined to be the reference in the last written entry referencing the LBA in the last written index page 328 (furthest from the second end) that includes a reference to the LBA.

Accordingly, the block map 338 for a slice may be reconstructed by searching the index pages 328 for the segments assigned to that slice in the segment map 314. In particular, for each LBA 332 referenced in the index pages 328, the block map 338 may update the entry for that LBA to indicate the PSID 316 of the segment where the last written data for that LBA is written as determined from the index pages 338 and the VSIDs 318 in the segment map.

This is a time consuming process. Accordingly, the method 1700 may be performed to use fragments from the BMAP store 1402, where possible, reconstruct the block maps 338. Note that the method 1800 may benefit from the segment map 314 being stored on disk and current. For example, in some instances, write IOPs are not acknowledged as completed successfully unless the segment to which the payload data of the write IOP is written is recorded as allocated in an on-disk copy of the segment map 314.

The method 1700 may include detecting 1702 restarting of the storage node 106. In response, the method 1700 includes reading 1704 the BMAP store 1402 into the BMAP cache 1400. In particular, for each slice of a storage volume, the fragments associated with that slice of the storage volume (per the metadata 1410) are assembled into a block map 338, such as in order of increasing fragment offsets for the fragments.

The method 1700 may further include evaluating 1706 the metadata 1410 for each fragment and evaluating whether the VSID in the metadata entry for the slice identifier and volume identifier to which the each fragment is mapped in the metadata 1410 is less than a highest VSID in the segment map 314 that is assigned to the same volume (or the same slice and the same volume where each slice has its own VSID counter). If so, then it is possible that the each fragment is not current. Accordingly, that portion of the block map 338 corresponding to the each fragment is reconstructed 1708 as described above. In particular, for the range of LBAs represented by the each segment, references to those LBAs in the index pages 324 are identified and used to reconstruct the each fragment as described in the preceding paragraphs. However, this process may include only searching those segments equal to or higher than the VSID in the metadata entry for the each fragment, which may reduce processing time. Those entries of the each fragment as copied from the BMAP store 1402 corresponding to LBAs that are not found in the segments with equal or higher VSIDs may remain unchanged whereas those that are not will be overwritten.

If the VSID in the entry in the metadata 1410 for the each fragment is equal to the highest VSID, then the fragment may be assumed to be current. In other approaches, the highest VSID segment is searched to determine if there are any writes to the LBAs of the each fragment. If so, then the entries for these LBAs in the fragment are updated to include the PSID of the highest VSID segment and the PO of the last written data addressed to these LBAs in the highest VSID segment as indicated in the index pages 324 of the highest VSID segment.

Figure 18:
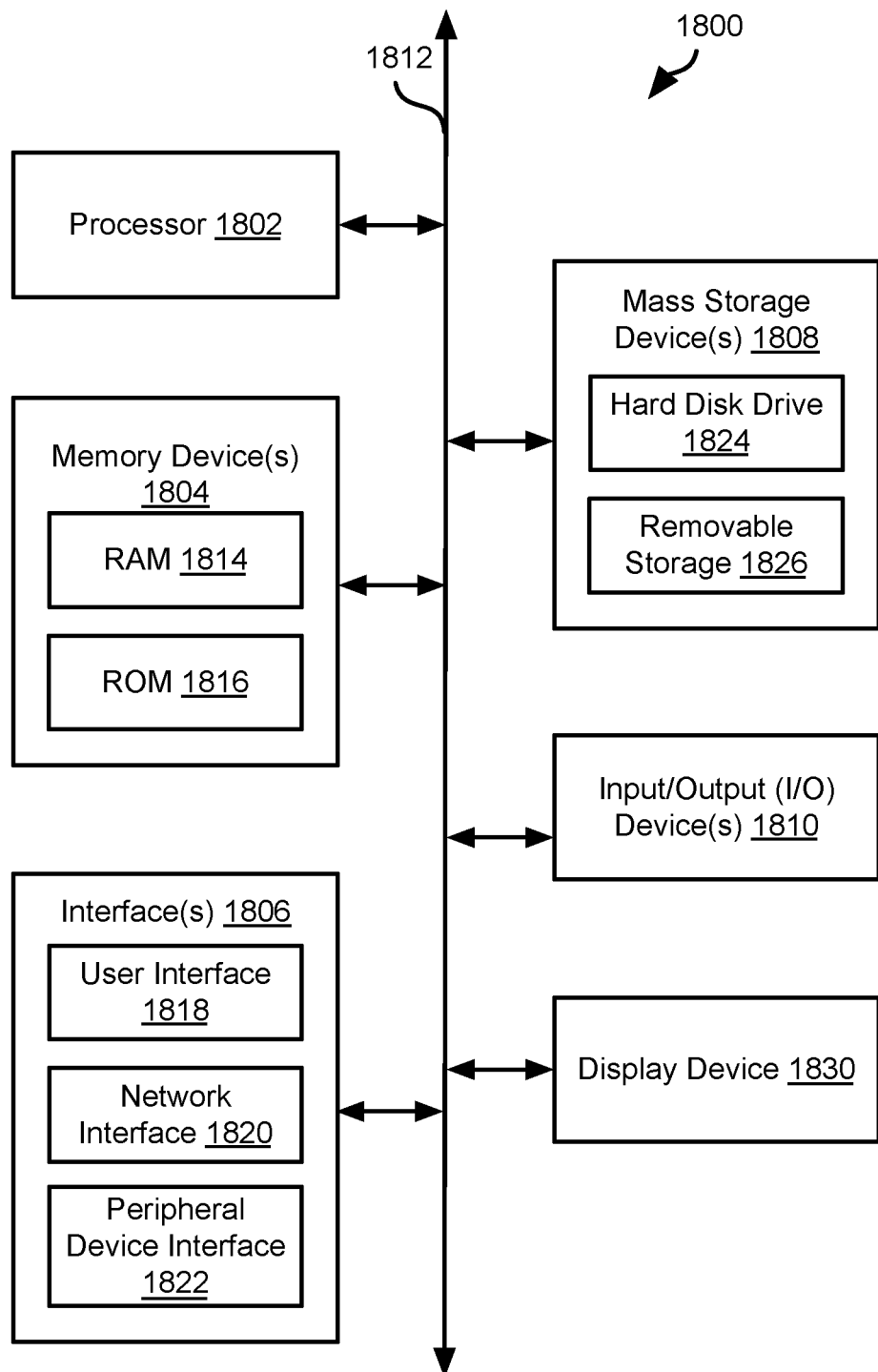
FIG. 18 is a schematic block diagram of an example computing device suitable for implementing methods in accordance with embodiments of the invention.

FIG. 18 is a block diagram illustrating an example computing device 1800. Computing device 1800 may be used to perform various procedures, such as those discussed herein. The storage manager 102, storage nodes 106, compute nodes 110, and hybrid nodes, or any computing device referenced herein may have some or all of the attributes of the computing device 1800.

Computing device 1800 includes one or more processor(s) 1802, one or more memory device(s) 1804, one or more interface(s) 1806, one or more mass storage device(s) 1808, one or more Input/output (I/O) device(s) 1810, and a display device 1830 all of which are coupled to a bus 1812. Processor(s) 1802 include one or more processors or controllers that execute instructions stored in memory device(s) 1804 and/or mass storage device(s) 1808. Processor(s) 1802 may also include various types of computer-readable media, such as cache memory.

Memory device(s) 1804 include various computer-readable media, such as volatile memory (e.g., random access memory (RAM) 1814) and/or nonvolatile memory (e.g., read-only memory (ROM) 1816). Memory device(s) 1804 may also include rewritable ROM, such as Flash memory.

Mass storage device(s) 1808 include various computer readable media, such as magnetic tapes, magnetic disks, optical disks, solid-state memory (e.g., Flash memory), and so forth. As shown in FIG. 18, a particular mass storage device is a hard disk drive 1824. Various drives may also be included in mass storage device(s) 1808 to enable reading from and/or writing to the various computer readable media. Mass storage device(s) 1808 include removable media 1826 and/or non-removable media.

I/O device(s) 1810 include various devices that allow data and/or other information to be input to or retrieved from computing device 1800. Example I/O device(s) 1810 include cursor control devices, keyboards, keypads, microphones, monitors or other display devices, speakers, printers, network interface cards, modems, lenses, CCDs or other image capture devices, and the like.

Display device 1830 includes any type of device capable of displaying information to one or more users of computing device 1800. Examples of display device 1830 include a monitor, display terminal, video projection device, and the like.

Interface(s) 1806 include various interfaces that allow computing device 1800 to interact with other systems, devices, or computing environments. Example interface(s) 1806 include any number of different network interfaces 1820, such as interfaces to local area networks (LANs), wide area networks (WANs), wireless networks, and the Internet. Other interface(s) include user interface 1818 and peripheral device interface 1822. The interface(s) 1806 may also include one or more peripheral interfaces such as interfaces for printers, pointing devices (mice, track pad, etc.), keyboards, and the like.

Bus 1812 allows processor(s) 1802, memory device(s) 1804, interface(s) 1806, mass storage device(s) 1808, I/O device(s) 1810, and display device 1830 to communicate with one another, as well as other devices or components coupled to bus 1812. Bus 1812 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1800, and are executed by processor(s) 1802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
   receiving, by a computing device including one or more processors, a memory and a persistent storage device, a plurality of write operations each including payload data referencing a logical storage unit of a plurality of logical storage units and a logical address within the logical storage unit;
   executing, by the computing device, each write operation by:
      writing the payload data at a physical offset within a physical segment of the persistent storage device, the physical segment being allocated to the logical storage unit of the each write operation; and
      updating a block map allocated to the logical storage unit in the memory to map the logical address to the physical segment, the block map being part of a block map cache;
   determining, by the computing device, that the block map cache is full up to a threshold condition; and
   in response to determining that the block map cache is full, writing, by the computing device, a copy of a selected block map of one of the logical storage units of the plurality of storage units to the persistent storage device and over writing the selected block map in the memory;
   wherein writing the copy of the selected block map to the persistent storage device comprises:
   writing the copy of the selected block map to a segment in the block map store;
   writing a metadata entry to the segment, the metadata entry including an identifier of the logical storage unit to which the selected block map is allocated and a segment offset within the segment at which the copy of the selected block map is stored.

2. The method of claim 1, wherein executing the each write operation further comprises mapping the logical address to the physical offset in the block map allocated to the logical storage unit.

3. The method of claim 1, further comprising, for a first write operation of the plurality of write operations:
   (a) determining that the block map allocated to the logical storage unit referenced by the first write operation is not stored in the memory;
   in response to (a) reading a copy of the first block map from the persistent storage device and writing the copy of the first block map in the block map cache.

4. The method of claim 1, wherein writing the copy of the selected block map to the persistent storage device comprises writing a plurality of fragments of the copy of the selected block map to the persistent storage device by, for each fragment of the plurality of fragments:
   writing the each fragment to a segment of a plurality of segments in the block map store, each segment of the plurality of segments in the block map store including metadata;
   writing a metadata entry to the metadata of the segment of the plurality of segments in the block map store, the metadata entry including an identifier of the logical storage unit to which the selected block map is allocated, a segment offset within the segment of the plurality of segments in the block map store at which the each fragment is stored, and a fragment offset indicating a location of the each fragment within the copy of the selected block map.

5. The method of claim 4, further comprising, for a first write operation of the plurality of write operations:
   (a) determining that the block map allocated to the logical storage unit referenced by the first write operation is not stored in the memory; and
   in response to (a):
      searching the metadata of the plurality of segments for a reference to the logical storage unit referenced by the first write operation and a fragment offset corresponding to the logical address of the first write operation;
      identifying a first segment of the plurality of segments storing a first fragment mapped to the logical storage unit referenced by the first write operation and mapped to the fragment offset corresponding to the logical address of the first write operation; and
      reading a copy of the first fragment from the persistent storage device and writing the copy of the first fragment in the block map cache.

6. The method of claim 4, wherein the plurality of fragments include only those portions of the selected block map corresponding to logical addresses referenced by previously-executed write requests of the plurality of write requests.

7. The method of claim 1, further comprising, for each logical storage unit of the plurality of logical storage units:
   for each physical segment of the physical storage device allocated to the each logical storage unit, assigning a virtual segment identifier (VSID) to the each physical segment in a segment map such that VSIDs are assigned according to a monotonically increasing counter for the each logical storage unit; and
   storing a value of the highest VSID assigned to the segments allocated to the logical storage unit of the selected block map at the time of writing the copy of the selected block map to the persistent storage device with the copy of the selected block map.

8. The method of claim 7, further comprising, for each logical storage unit of the plurality of logical storage units, in response to detecting restarting of the computing device:

when a copy of the block map for the each logical storage unit is stored in the persistent storage device, comparing a VSID stored with the copy of the block map for the each logical storage unit to a highest VSID assigned to the each logical storage unit in the segment map;

when the VSID stored with the copy of the block map is lower than the highest VSID assigned to the each logical storage unit in the segment map, reconstructing the block map for the each logical storage unit according to metadata stored in the physical segments allocated to the each logical storage unit and assigned VSIDs that are higher than the VSID stored with the copy of the block map for the each logical storage unit.

9. The method of claim 8, wherein the metadata stored in each physical segment allocated to the each logical storage unit includes a plurality of entries, each entry including logical address within the each logical storage unit and a physical offset at which payload data corresponding to that logical address is stored.

10. A system comprising one or more processing device, one or more memory devices operably coupled to the one or more processing devices, and one or more storage devices operably coupled to the one or more processing devices, the one or more memory devices storing executable code effective to cause the one or more processing devices to:

receiving a plurality of write operations each including payload data referencing a logical storage unit of a plurality of logical storage units and a logical address within the logical storage unit;

execute each write operation by:
   writing the payload data at a physical offset within a physical segment of the one or more storage devices, the physical segment being allocated to the logical storage unit of the each write operation; and
   updating a block map allocated to the logical storage unit in the one or more memory devices to map the logical address to the physical segment, the block map being part of a block map cache; and when the block map cache is full up to a threshold condition, write a copy of a selected block map of one of the logical storage units of the plurality of storage units to the persistent storage device and over writing the selected block map in the one or more memory devices, wherein the executable code is further effective to cause the one or more processing devices to write the copy of the selected block map to the one or more storage devices by:

writing a plurality of fragments of the copy of the selected block map to the one or more storage devices by, for each fragment of the plurality of fragments;
   writing the each fragment to a segment of a plurality of segments in the block map store, each segment of the plurality of segments including metadata;
   writing a metadata entry to the metadata of the segment of the plurality of segments in the block map store, the metadata entry including an identifier of the logical storage unit to which the selected block map is allocated, a segment offset within the segment of the plurality of segments in the block map store at which the each fragments is stored, and a fragment offset indicating a location of the each fragment within the copy of the selected block map.

11. The system of claim 10, wherein the executable code is further effective to cause the one or more processing devices to execute the each write operation by mapping the logical address to the physical offset in the block map allocated to the logical storage unit.

12. The system of claim 10, wherein the executable code is further effective to cause the one or more processing devices to write the copy of the selected block map to the one or more storage devices by:
   writing the copy of the selected block map to a segment in the block map store;
   writing a metadata entry to the segment, the metadata entry including an identifier of the logical storage unit to which the selected block map is allocated and a segment offset within the segment at which the copy of the selected block map is stored.

13. The system of claim 12, wherein the executable code is further effective to cause the one or more processing devices to, for a first write operation of the plurality of write operations:
   when the block map allocated to the logical storage unit referenced by the first write operation is not stored in the one or more memory devices, read the first block map from the one or more storage devices and write the first block map in the block map cache.

14. The system of claim 10, wherein the executable code is further effective to cause the one or more processing devices to, for a first write operation of the plurality of write operations:
   when the block map allocated to the logical storage unit referenced by the first write operation is not stored in the one or more memory devices:
      search the metadata of the plurality of segments in the block map store for a reference to the logical storage unit referenced by the first write operation and a fragment offset corresponding to the logical address of the first write operation;
      identifying a first segment of the plurality of segments in the block map store storing a first fragment mapped to the logical storage unit referenced by the first write operation and mapped to the fragment offset corresponding to the logical address of the first write operation; and
      reading the first fragment from the persistent storage device and writing the first fragment in the block map cache.

15. The system of claim 10, wherein the plurality of fragments include only those portions of the selected block map corresponding to logical addresses referenced by previously-executed write requests of the plurality of write requests.

16. A system comprising one or more processing device, one of more memory devices operably coupled to the one or more processing devices, and one or more storage devices operably coupled to the one or more processing devices, the one or more memory devices storing executable code effective to cause the one or more processing devices to:
   receiving a plurality of write operations each including payload data referencing a logical storage unit of a plurality of logical storage units and a logical address within the logical storage unit;
   execute each write operation by:
      writing the payload data at a physical offset within a physical segment of the one or more storage devices, the physical segment being allocated to the logical storage unit of the each write operation; and
      updating a block map allocated to the logical storage unit in the one or more memory devices to map the logical address to the physical segment, the block map being part of a block map cache; and when the block map cache is full up to a threshold condition, write a copy of a selected block map of one of the logical storage units of the plurality of storage units to the persistent storage device and over writing the selected block map in the one or more memory devices;

wherein the executable code is further effective to cause the one or more processing devices to, for each logical storage unit of the plurality of logical storage units:

for each physical segment of the physical storage device allocated to the each logical storage unit, assign a virtual segment identifier (VSID) to the each physical segment in a segment map such that VSIDs are assigned according to a monotonically increasing counter for the each logical storage unit; and store a value of the highest VSID assigned to the segments allocated to the logical storage unit of the selected block map at the time of writing the copy of the selected block map to the one or more storage devices with the copy of the selected block map.

17. The system of claim 16, wherein the executable code is further effective to cause the one or more processing devices to, for each logical storage unit of the plurality of logical storage units, in response to detecting restarting of the computing device:

when a copy of the block map for the each logical storage unit is stored in the persistent storage device, compare a VSID stored with the copy of the block map for the each logical storage unit to a highest VSID assigned to the each logical storage unit in the segment map;

when the VSID stored with the copy of the block map is lower than the highest VSID assigned to the each logical storage unit in the segment map, reconstruct the block map for the each logical storage unit according to metadata stored in the physical segments allocated to the each logical storage unit and assigned VSIDs that are higher than the VSID stored with the copy of the block map for the each logical storage unit.

18. The system of claim 17, wherein the metadata stored in each physical segment allocated to the each logical storage unit includes a plurality of entries, each entry including logical address within the each logical storage unit and a physical offset at which payload data corresponding to that logical address is stored.

* * * * *

UNITED STATES PATENT AND TRADEMARK OFFICE
CERTIFICATE OF CORRECTION

PATENT NO. : 10,976,938 B2
APPLICATION NO. : 16/049073
DATED : April 13, 2021
INVENTOR(S) : Mukku et al.

Page 1 of 1

It is certified that error appears in the above-identified patent and that said Letters Patent is hereby corrected as shown below:

In the Claims

In Column 25, Line 62, the word "fragments" should be corrected to "fragment".

In Column 26, Line 50, the word "of" should be corrected to "or".

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*